United States Patent

Bodkin

[11] Patent Number: 6,023,061
[45] Date of Patent: Feb. 8, 2000

[54] MINIATURE INFRARED CAMERA

[75] Inventor: William Andrew Bodkin, Needham, Mass.

[73] Assignee: Microcam Corporation, Waltham, Mass.

[21] Appl. No.: 08/758,339

[22] Filed: Dec. 3, 1996

Related U.S. Application Data

[60] Provisional application No. 60/007,961, Dec. 4, 1995.

[51] Int. Cl.[7] .................. G01J 5/02; G01J 5/06
[52] U.S. Cl. .................. 250/332; 250/252.1
[58] Field of Search .............. 250/338.3, 338.4, 250/349, 352, 370.08, 370.15, 252.1 A, 332, 338.1

[56] References Cited

U.S. PATENT DOCUMENTS

| | | | |
|---|---|---|---|
| 4,142,207 | 2/1979 | McCormack et al. | 250/338.2 X |
| 4,724,326 | 2/1988 | Poultney et al. | 250/332 X |
| 5,371,358 | 12/1994 | Chang et al. | 250/252.1 X |
| 5,373,151 | 12/1994 | Eckel, Jr. et al. | 250/332 X |
| 5,420,419 | 5/1995 | Wood | 250/352 X |
| 5,534,697 | 7/1996 | Creekmore et al. | 250/332 |
| 5,675,149 | 10/1997 | Wood et al. | 250/332 |

*Primary Examiner*—Edward J. Glick
*Attorney, Agent, or Firm*—Lappin & Kusmer LLP

[57] ABSTRACT

A miniaturized IR camera mounts within a vehicle such as an airborne reconnaissance airplane. The camera includes a two dimensional uncooled FPA, a compound lens for imaging IR radiation onto the FPA, means for adjusting the distance between the lens and the FPA to adjust focus, an electronic module that controls camera read out, calibration, and signal processing, and means for flexibly coupling the FPA to the module. In accord with the invention, the module and the FPA are reconfigurable within the vehicle so that the FPA head can be fit into a tight place, or into a location that is separate from the rest of the camera, such as on top of a vehicle. The invention further provides for calibration techniques whereby the scene, sky or shutter are used to thermally calibrate the several uncooled detectors. Focus, tilt and tip adjustments permit simple adjustment of the FPA to achieve proper focus and alignment. The electronics module can be controlled through manual interface, remote signals, or internal clocking. Heat sinks dissipate heat from the FPA as well as from a TE Cooler, if present.

42 Claims, 20 Drawing Sheets

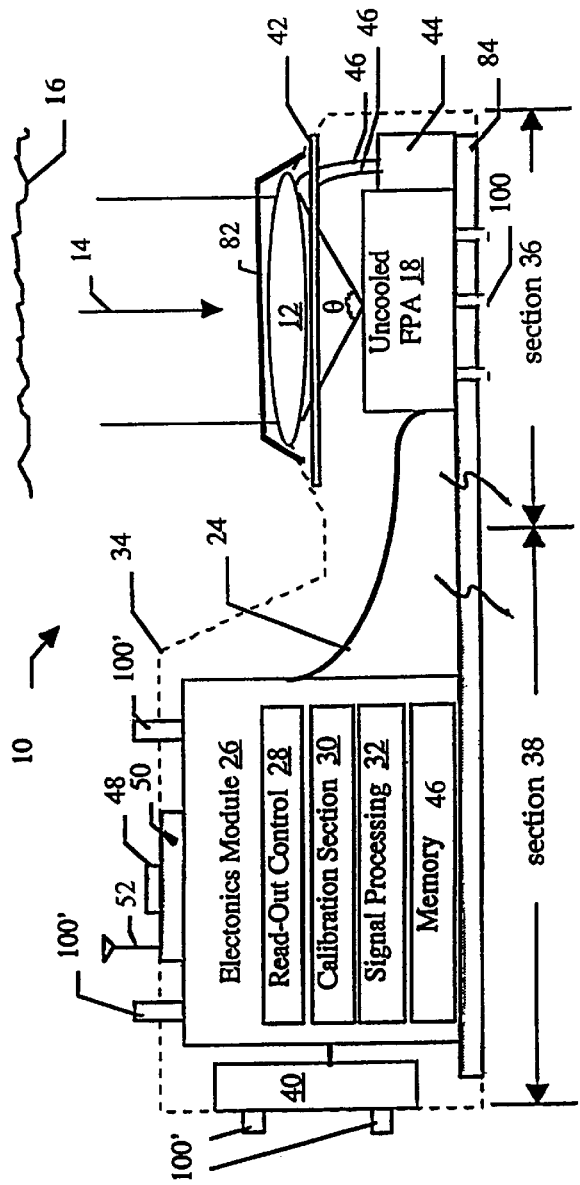
FIG 1
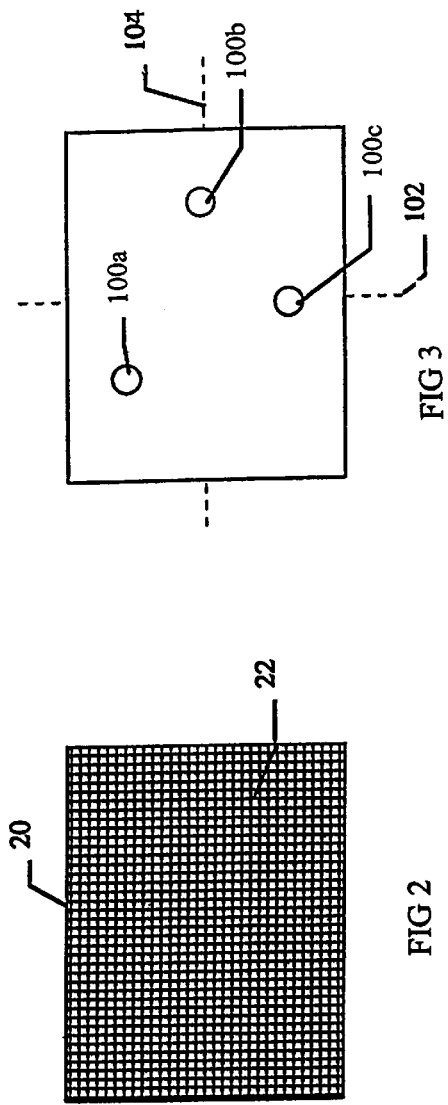
FIG 3
FIG 2

SPECIFICATIONS

TEMPERATURE RANGE
    OPERATING:     60 to -20 Deg. C
    STORAGE:     60 to -20 Deg. C

| OPTICS | DESIGN | |
|---|---|---|
|  | FOLDED | STRAIGHT |
| F-NUMBER: | 1.4 | 1 |
| FOCAL LENGTH: | 25.4 mm | |
| TFOV: | 33 x 25 Deg. | |
| PFOV (IFOV): | 1.8 mrad | |

DETECTOR
    # OF PIXELS:     327 x 245
    PIXEL PITCH:     46.25 um Sq.
    FILL FACTOR:     50%
    ARRAY SIZE:     15.1 H. x 11.3 V. mm
    SPECTRAL RANGE:     8 - 14 um
    NEDT:     0.02 Deg. C
    THERMAL DISSIPATION:     3.5 W

MECHANICAL ENVELOPE
    SENSOR:     3 x 3 x 3 in.
    DRIVER:     1.4 x 5.1 x 7.1 in.

ELECTRICAL
    OPERATING VOLTAGE:     12 V
    POWER:     7.5 W
    CALIBRATE:     MANUAL
    SIGNAL FORMAT:     NTSC

| WEIGHT (in ounces) | FOLDED | STRAIGHT | |
|---|---|---|---|
| LENS: | 6.6 | 1.8 | |
| SENSOR: | 6.7 | 6.7 | |
| DRIVER: | 11.3 | 11.3 | |
| TOTAL WEIGHT: | 24.6 | 19.8 | oz |

FIG 10

```
Receiver Parameters
    Number of Pixels                 328
2.7  cm   Receiver aperture          2.7
32.3 deg  Total FOV                  32.3
.78       Xmission thru rcvr optics
1         Xmission through filter
8    µm   Filter Cut-on Wavelength
14   µm   Detector Cut-off 264         δI/δT    (µwatt/cm2 / K)
                                     1           f/#
                                     2.69  cm    Focal Length
                                     4.12  in    Pixel Image at 200 feet
                                     1.72  mrad  Pixel Field of view System Parameters
301  K    Temperature of target      .001        Probability of false alarm
300  K    Temperature of background  .999        Probability of Detection
2    /Km  Atmospheric ext. coeff.
.3        Target Emittance           DEARRAY     System Name Detector Parameters
60   hz   Frame Rate                 2           Read-out Noise Figure
50   %    Fill Factor                1E-7  W/K   Thermal Conductance
80   %    Absorptance                46.25 µm    Detector Side Dimension
100  %    Xmssion thru Window        .022  K     NETD
```

For Pfa = 0.001, Required TNR    =  3.09    SNR at   0 ft Range  =  13.78
For Pd  = 0.999, Required SNR    =  6.18    SNR at 200 ft Range  =  12.20
Min DEL Temp to detect @ 200 ft  =  0.51 K  Maximum Detection Range =  1316 ft
       (R)eceiver      (S)ystem    (D)etector          (Q)uit

FIG 11

```
CODE V> lis
    HL-UAV 1" f/1 30x22deg
                RDY           THI         RMD       GLA            CCY    THC    GLC
   OBJ:     INFINITY       INFINITY                                100    100
 > STO:       4.68717       0.133772            GERMLW_SPECIAL       0      0
     2:       6.67265       4.886104                                 0    PIM
        ASP:
         K  :   0.000000        KC :     100
         IC :      YES          CUF:   0.000000      CCF:    100
         A  :0.155325E-02       B ':-.109062E-01     C  :0.325260E-01  D  :-.335092E-01
         AC :      0            BC :     0           CC :      0       DC :      0

IMG:     INFINITY       0.000000                                   100    100

SPECIFICATION DATA
     EPD       1.24825
     DIM        IN
     WL     13000.00    10000.00    8000.00
     REF        2
     WTW        1           1          1
     XAN        0.00000     0.00000    0.00000    0.00000
     YAN        0.00000     2.55000    3.40000    4.25000
     VUY        0.00000     0.00285    0.00380    0.00475
     VLY        0.00000    -0.00285   -0.00380   -0.00475

REFRACTIVE INDICES
     GLASS CODE                  13000.00    10000.00    8000.00
     GERMLW_SPECIAL               4.001815    4.003073    4.005260

SOLVES
     PIM

INFINITE CONJUGATES
     EFL         4.9930
     BFL         4.8861
     FFL        -5.0681
     FNO         4.0000
     IMG DIS     4.8861
     OAL         0.1338
     PARAXIAL IMAGE
         HT      0.3710
         ANG     4.2500
     ENTRANCE PUPIL
         DIA     1.2483
         THI     0.0000
     EXIT PUPIL
         DIA     1.2298
         THI    -0.0329
                                                            27-Sep-95  14H 25M 34S
                                                            CPU clock:  0H  0M  9S
 CODE V> vie
         VIE                         CODE V SUN Version: 8.04 B VIE> go
     The scale factor has been set to 1.4
 VIE> go 27-Sep-95  14H 26M  8S
                                                            CPU clock:  0H  0M  9S
 CODE V> rim
         RIM                         CODE V SUN Version: 8.04 B RIM> ssi .002
 RIM> go
     WARNING - Some points have not been plott
 RIM> go 27-Sep-95  14H 26M 51S
                                                            CPU clock:  0H  0M  9S
 CODE V> mtf
         MTF                         CODE V SUN Version: 8.04 B MTF> mfr 20
 MTF> ifr 5
 MTF> plo (re y
 MTF> go
     WARNING - At least 3 focal positions are recommended for finding best focus
```

FIG 12

OPTICAL DESIGN TRADE OFF TABLE

| DESIGN | | | PERFORMANCE | | | | COST |
|---|---|---|---|---|---|---|---|
| TITLE | # ELEMENTS | NO. OF ASPHERIC SURFACES | LENS WEIGHT OZ. | MTF AT CUTOFF % OF DIFF. LIMIT | F# | DET. DELTA T @ 200 FT (DEG C) | FIT CONSTRAINTS | EST. PRICE EACH FOR 100 PCS. |
| BASELINE | 3 | 4 | 0.8 | 86% | 1.0 | 0.58 | MAX. DECL. 12 DEG | $1,600 |
| #4 | 3 | 2 | 3.1 | 90% | 1.0 | 0.58 | TOO BIG IN FRONT | $1,600 |
| #6 | 2 | 2 | 7.7 | 81% | 1.0 | 0.51 | TOO BIG IN FRONT | $1,050 |
| #7 | 2 | 2 | 6.3 | 45% | 1.0 | 0.51 | MAX DECL 12 DEG | $1,050 |
| #9 | 2 | 2 | 5.7 | 83% | 1.0 | 0.51 | MAX DECL 12 DEG | $1,050 |
| #10 | 2 | 2 | 6.3 | 87% | 1.0 | 0.51 | MAX DECL 12 DEG | $1,050 |
| #11 | 2 | 1 | 6.4 | 62% | 1.0 | 0.51 | MAX. DECL 12 DEG | $1,050 |
| #15 | 3 | 2 | 1.1 | 92% | 1.0 | 0.58 | MAX DECL 12 DEG | $1,600 |
| #16 | 3 | 1 | 1.1 | 91% | 1.0 | 0.58 | MAX. DECL 12 DEG | $1,600 |
| #17 | 2 | 2 | 1.2 | 41% | 1.0 | 0.51 | MAX. DECL 12 DEG | $1,050 |
| #1 | 1 | 0 | 5.1 | 0% | 1.5 | 1.59 | | $550 |
| #2 | 1 | 1 | 5.1 | 12% | 1.0 | 0.51 | MAX. DECL 12 DEG | $550 |
| #3 (F) | 3 | 3 | 2.8 | 30% | 1.0 | 0.99 | FOLDED | $1,750 |
| #5 (F) | 3 | 2 | 8.8 | 70% | 1.0 | 0.99 | FOLDED | $1,750 |
| #8.4 (F) | 2 | 2 | 4.6 | 92% | 1.4 | 0.91 | FOLDED | $1,200 |
| #8.3 (F) | 2 | 2 | 5.2 | 82% | 1.3 | 0.81 | FOLDED | $1,200 |
| #8.2 (F) | 2 | 2 | 6.3 | 76% | 1.2 | 0.70 | FOLDED | $1,200 |
| #8.1 (F) | 2 | 2 | 8.0 | 69% | 1.1 | 0.63 | FOLDED | $1,200 |

FIG 12C

MINIATURE INFRARED CAMERA

RELATED APPLICATIONS

This application is a continuation-in-part of U.S. provisional application Ser. No. 60/007,961, entitled Miniature Infrared Camera and filed on Dec. 4, 1995, and which is hereby expressly incorporated herein by reference.

STATEMENT REGARDING FEDERALLY SPONSORED RESEARCH OR DEVELOPMENT

This invention was made with Government support under contract number N00019-95-C-0059 awarded by Naval Air Systems Command. The government has certain rights in the invention.

The U.S. Government has a paid-up license in this invention and the right in limited circumstances to require the patent owner to license others on reasonable terms as provided for by the terms of contract number N00019-95-C-0059 awarded by Naval Air Systems Command.

FIELD OF THE INVENTION

The invention relates to miniaturized camera architectures, and particularly to small, light-weight infrared cameras for hand-launched, unmanned aerial vehicles.

BACKGROUND

Surveillance techniques have been greatly improved with the advent of modern electro-optic technology. Miniature Charge Coupled Device (CCD) cameras and transmitters have made daytime surveillance possible from locations previously unavailable. By way of example, highly sensitive CCD arrays with micro-lenses have extended the nighttime surveillance capability out to near-starlight conditions. With an image intensifier (sometimes denoted herein as I^2) coupled to a CCD array, remote surveillance by starlight is a reality. The prior art has miniaturized the CCD and I^2 combination to a form compatible with nearly all practical applications requiring compactness. However, the CCD and I^2 combination also requires some small quantity of visible light in order to function. As the available source light diminishes—such as during overcast, nighttime conditions—the imagery gets spotty and unusable.

Infrared (IR) imagers extend surveillance beyond starlight into no-light conditions. Visible light is not required for IR imaging because the self-emission of objects in the infrared suffices for their operation. In the infrared, the scenery at nighttime appears the same as the scenery in the daytime. This feature brings the added benefit that camouflaged targets are revealed by self-luminance. For example, men hiding in undergrowth emit due to the heat of their bodies and are easily revealed in the IR image.

The prior art IR cameras are large and unwieldy as compared to the CCD and I^2 combination discussed above. By way of example, one of the first practical IR cameras was a mechanically scanned Forward Looking Infrared (FLIR) system that is bulky, fragile, power intensive, and that requires cryogenic cooling to reduce detector noise. The FLIR system has been improved with the two-dimensional IR focal plane array (FPA), which does not require a mechanical scanner and which is therefore sturdier and less unwieldy than the FLIR. However, the IR FPA still requires cryogenic cooling. This cooling makes it impractical to construct lightweight and compact IR systems, such as that required for unmanned reconnaissance vehicles.

One development in infrared technology concerns "uncooled" IR focal plane arrays. The uncooled FPA is nearly analogous to the CCD array: it is small, sturdy, requires no cooling, and is made from common silicon materials. The uncooled camera permits viewing of IR scenes without the use of coolers and is, therefore, useful in applications requiring compactness. Two of the common uncooled FPAs include: microbolometers, which are essentially miniaturized versions of the common bolometer detector (see, e.g., *The Infrared Handbook* edited by Wolfe et al., Office for Naval Research, 11–20 (1978); and ferroelectric devices, which measure temperature differences by sensing polarization-induced charge differentials, see, *Id.,* 11–58.

Lockheed-Martin IR Imaging Systems (formerly Loral Infrared and Imaging Systems) makes one prior art uncooled microbolometer FPA. The Lockheed-Martin FPA measures approximately 2"×2"×½", and the associated electronics board measures about 2"×3"×½". There is an integrated circuit imbedded within a silicon substrate adjacent to each microbolometer which permits selective processing of the thermal signals.

Texas Instruments makes a competing ferroelectric uncooled FPA. It too has similar size and permits the acquisition of IR imagery without the use of cryogenic coolers and mechanical scanners.

The uncooled FPAs of the prior art have useful application in many areas of thermal imaging. However, their use in miniaturized IR cameras, and in particular within IR cameras designated for unmanned vehicles, is problematic. First, the interface between the sensor and the electronics is unwieldy when configured within the confines of an unmanned vehicle. Second, the optical designs which focus the IR radiation onto the detectors are generally large and impractical for miniaturized applications. Third, the uncooled cameras of the prior art typically require choppers to provide for thermal and/or noise calibration of the FPA. These choppers, again, add cost, weight, and limit compactness. Fourth, certain prior art uncooled FPAs and associated electronics are "tuned" to each other. Accordingly, FPAs and their electronics are not generally modular such that either can be removed and replaced efficiently.

It is, accordingly, an object of the invention to provide a compact IR camera that overcomes most, if not all, of the above-referenced problems.

Another object of the invention is to provide methodology for manufacturing miniaturized IR cameras and unmanned reconnaissance vehicles.

Still another object of the invention is to provide compact optical designs for application with IR cameras and remotely piloted vehicles.

Still another object of the invention includes methodology for calibrating IR cameras in unmanned vehicles without use of moving shutters or choppers.

One other object of the invention provides for tying electronic boards to IR FPAs in a reconfigurable manner to facilitate mounting within housings of selectable shape while maintaining a single production line.

Yet another object of the invention is to provide a compact, IR reconnaissance vehicle.

And another object of the invention is to provide a modular, miniaturized IR FPA and electronics capable of mating and demating with other such IR FPAs and electronics, without complex calibration or tuning.

These and other objects will become apparent in the description which follows.

SUMMARY OF THE INVENTION

As used herein, an "uncooled" FPA includes those microbolometer FPAs as manufactured, for example, by Lockheed-Martin, ferroelectric devices as manufactured, for example, by Texas Instruments, and other uncooled IR FPAs such as manufactured by Amber.

By way of background, certain prior art uncooled FPA microbolometer detectors by Honeywell, Inc., are described in U.S. Pat. Nos. 5,286,976, 5,300,915, and 5,021,663, each of which are hereby incorporated by reference. These detectors include those uncooled microbolometer detectors which have a two-level microbridge configuration: the upper level and lower level form a cavity that sensitizes the bolometer to radiation of a particular range of wavelengths; the upper level forms a "microbridge" which includes a thermal sensing element; the lower level includes the read-out integrated circuitry and reflective material to form the cavity; the upper microbridge is supported by legs which thermally isolate the upper level from the lower level and which communicate electrical information therein and to the integrated circuitry.

In one aspect, the invention provides a miniaturized IR camera which mounts within a vehicle such as an airborne reconnaissance airplane. The camera in this aspect includes a two dimensional uncooled FPA, a compound lens for imaging IR radiation onto the FPA, means for adjusting the distance between the lens and the FPA to adjust focus, an electronic module that controls camera read out, calibration, and signal processing, and means for flexibly coupling the FPA to the module, wherein the module and the FPA are reconfigurable within the vehicle. In a preferred aspect of the invention, the flexible coupling includes an electric cable which tethers the FPA to the electronic module. As such, the sensor FPA head can be fit into a tight place, or into a location that is separate from the rest of the camera, such as on top of a vehicle.

Accordingly, the invention provides for a flexible miniature IR camera that can be reconfigured within many vehicle shapes. A single production facility of the camera can thus support many different uses of the camera within vehicles of varying size, shape, and viewing angle. By way of example, an unmanned vehicle manufactured by the United States is quite probably different than an unmanned vehicle manufactured by the Europeans. However, because of the flexible configuration of the FPA relative to the electronics module, the camera of the invention is easily adapted for different vehicle designs. This also saves in production costs in that re-tooling of different cameras for different vehicles is reduced or eliminated.

Preferably, the FPA detectors of this aspect are an array of micro-machined bolometers. These bolometers convert the IR optical signal to a change in temperature, which is measured as a change in conductivity of the bolometer. In another aspect, the FPA detectors are ferroelectric devices. In still another aspect, the FPA detectors are manufactured from common silicon semiconductor materials.

One advantage of utilizing uncooled FPA detectors, according to the invention, is that such a camera does not require cryogenic cooling or a scanner to scan the field of regard. Rather, the uncooled FPA is formed by an array of detectors which, with the IR lens, provides its own field of regard. Accordingly, an IR camera of the invention is more reliable than other methods of infrared detection because of the relatively simple mechanical design, without moving parts; and because of the lack of thermal stresses caused to cryogenic cooling. Without these thermal and mechanical support systems, the IR camera of the invention is lighter, requires less power than other IR systems, and is more compact. Further, an IR camera of the invention is robust as compared to prior art IR cameras because it has no moving which can wear out during operation.

In one preferred aspect, a camera of the invention weighs less than 1.5 pounds, including its lens system, a heat stabilizer, and a housing. In another aspect, the camera of the invention preferably operates on low power and thus runs on batteries. In another aspect, the camera operates entirely from solar power.

In another aspect, the uncooled FPA is formed from silicon that is sensitive to thermal radiation in a wavelength band of about 8–14 $\mu$m. Alternatively, the FPA is manufactured so as to be sensitive to radiation over a broader range of wavelengths, such as from 2–14 $\mu$m, and a filter is installed with the camera to limit the radiation to a particular waveband, such as 8–12 $\mu$m. By way of example, one camera of the invention is sensitive from 2–4 $\mu$m, and another is sensitive to millimeter wavelengths. In the prior art of microbolometer design, for example, those skilled in the art will appreciate that the detector waveband can be selected by adjusting the cavity dimensions between the upper and lower levels of the microbridge.

In still another aspect, the camera of the invention includes memory means for storing selective information, such as (a) IR image data, (b) calibration data, (c) command and control sequences, (d) scaling information, and (e) user-selected options.

In other aspects, a camera of the invention includes means for calibrating the FPA relative to a thermally uniform scene. The FPA of the invention can be calibrated by one or more of five methods described herein. In a first method, a digital picture of a thermally uniform scene at known temperature is stored in the camera's memory and used to correct subsequent images taken by the camera. This method offsets the individual FPA detector signal differences to yield a uniform response for a thermally uniform scene.

In the prior art, the uniform scene is generally acquired via an electro-mechanical shutter, whereinafter the image is corrected to compensate for the detector non-uniformities. Accordingly, this aspect of the invention does not require moving parts and is therefore less cumbersome, in weight and complexity, as compared to prior art IR camera systems with an electromechanical shutter.

In a second method of the invention, and in another aspect, the IR camera uses a sky calibration. Specifically, the camera captures an image of the sky to calibrate the FPA. To acquire the sky image in this aspect, a gravity switch is used to trigger the calibration routine when the manned or unmanned airplane is tilted towards the sky. More particularly, the plane is controlled so as to force the camera to view the sky, briefly, thereby tripping the gravity switch and initiating the calibration routine within the camera. When the plane is controlled so as to return to its normal, image gathering flight path, the gravity switch again triggers and terminates the calibration routine (alternatively, the calibration routine can be terminated after a predetermined time lapse of an internal clock).

In a third method of the invention, the camera is calibrated using an image averaging subsystem that captures a blurred image of the ground by integrating multiple frames together during motion of the camera, and then dividing the integrated frame total by the total number of frames used to determine an average scene. This integrated average image is considered a uniform scene that is stored in memory and used as a calibration offset.

A fourth technique according to the invention uses (a) a gravity shutter, which closes when the camera is tilted to a specified angle, and (b) a switch that trips when the gravity shutter closes. Together, the combination of a gravity shutter and the switch provides for a simple acquisition of a calibrated image on the shutter surface (at a known temperature).

The fifth technique according to the invention utilizes a manual lens cover to cover the lens. Once covered, a calibration routine is started by any of the triggering mechanisms described above—such as by tilting the camera to (a) trip the gravity shutter and switch or (b) to trigger the gravity switch—or by pushing a manual button on the camera body. This manual calibration technique is normally used in conjunction with other techniques described above so that the camera realizes a substantially uniform temperature calibration at the start of operation. Thus, for example, if the operation is a short flight, no further calibrations may be needed. Otherwise, any of the other above-described techniques can be used to recalibrate, as needed, during the flight operation.

Accordingly, those skilled in the art should appreciate that combinations of the above-described calibration techniques can be used according to the invention.

In other aspects of the invention, three specially designed lens systems are provided which image IR radiation onto the FPA and which facilitate compactness of the overall camera. Preferably, the materials of the lens systems are made from Germanium, which produces the highest refractive power for a given weight, thereby yielding a lighter lens system. Each system also has only one aspheric surface, thereby reducing manufacturing cost. One system has no reflective surfaces; one system incorporates a single fold mirror; and one system has only one lens. The fold mirror allows the system to be fit into a small diameter fuselage such as within a hand launched unmanned aerial vehicle.

In still another aspect, the lens systems of the invention can include an IR transparent thin plastic sacrificial cover that is transmissive in the infrared.

In a preferred aspect of the invention, the FPA is maintained at a selected temperature by a thermal-electric heater-cooler (hereinafter a "TE Cooler"). The TE Cooler dissipates heat which should be removed from the camera in order to obtain the best results. In accord with the invention, three separate dissipation schemes are provided for removing heat from the camera. In the first scheme, a passive heat sink is utilized to dissipate heat through thermal convection. In a second scheme, a vented airflow is utilized which improves dissipation by venting external air through openings in the housing surrounding the camera and over a heat sink. In a third scheme, a heat pipe is utilized which dissipates heat to an external radiator in the air stream.

In another aspect of the invention, two or more IR cameras, such as described above, are coupled together into a composite sensor with contiguous or overlapping fields of view so as to increase the overall field of regard of the composite sensor.

In still another aspect of the invention, a lens focus mechanism and mount provide adjustment between the lens and the FPA. Such adjustment includes, in other aspects, (a) a distance between the lens and FPA and (b) a tip and tilt of the FPA. In a preferred aspect, the adjustment is provided through a three-screw configuration. In particular, by adjusting the three screws, tip, tilt and focus can be adjusted. Tip and tilt is desired because of the short depth of focus of the lens system, which generally has a low f-number. The precision of the three screws is preferably augmented by a differential screw mechanism, which has two nested threaded components. The inner thread has a finer pitch as compared to the outer thread. By turning the outer threaded tube, a displacement equal to the difference of the two thread pitches is accomplished. In this way the length of the screw can be adjusted to better than 0.0005 inches accuracy.

The invention also provides for certain manufacturing procedures to facilitate the construction of miniaturized solid state cameras. Specifically, in certain aspects, the camera is constructed from a minimal number of parts, to reduce cost and weight. In another aspect, the lenses are exchangeable and interchangeable so as to facilitate the manufacturing process. In other aspects, most, if not all, of the screws and fasteners are used for multiple tasks. By way of example, the screws that hold the FPA can also adjust the FPA focus, tip and tilt. In still another aspect, the heat sink is detachable and interchangeable. In yet another aspect, the screws that hold the heat sink to the FPA also hold the FPA into a lower housing. Further, the screws that secure the electronic board into a support case can also be used to hold the support case together.

In accord with the invention, it is possible and desirable to tailor the spectral band of the camera, which is useful for identifying various objects in the scene. There are several ways to tailor the spectral band imaged onto the FPA, in accord with the invention, including: placing a single fixed filter in the optical path to the FPA; utilizing multiple cameras with different filters viewing the same scene, either with a common boresight alignment or by combining the field of view via a dichroic beam splitter; inserting a wheel of different filters into the optical stream and rotating the wheel, as needed, to change filters; inserting a single filter disc with a continuously varying band pass into the optical beam and rotating the disc, as needed, to vary the spectral transmittance therethrough; and utilizing an electro-optic tunable filter which can be used to select the desired wavelength band.

In another aspect, a line of the scene can be imaged though a dispersive element such as a prism or grating to disperse the line across the array into its constituent colors. If the line image is vertical, each horizontal row in the array yields spectral information for one pixel. The line is then scanned over the scene. The two dimensional image is built up as the sum of the line images. This technique yields a cube of data, that has 2D spatial information as well as 3rd dimension of spectral information for each pixel. Scanning is accomplished with an optical scanner or by moving the camera across the scene.

Spectral sensing has several advantages in accord with the invention. It is useful for finding different crop species, examining exhaust plumes, measuring atmospheric constituents, determining signatures of rocket plumes, or to determine absolute temperatures.

Those skilled in the art should appreciate that although certain of the IR cameras described herein are discussed relative miniaturized remotely controlled aircraft to conduct day and night time remote surveillance, the cameras of the invention are far reaching and can be applied to numerous other applications. For example, the IR camera of the invention is suitable for certain monitoring devices for compact security systems. The IR camera of the invention has several features which can be utilized separately or in conjunction with other features discussed herein. The camera of the invention also has practical application as (a) a moving surveillance device on satellites, manned planes, automobiles, helmets for individuals, and gun sights; and (b) as a fixed camera for process control, surveillance, heat tracking, and in remote sensing, and in applications that require insertion of the camera into a confined space such as for pipe inspection.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIG. 1 shows a schematic illustration of a miniature uncooled camera constructed according to the invention;

FIG. 2 shows, in a front view, further detail of the two dimensional uncooled focal plane array within the camera of FIG. 1;

FIG. 3 shows a back view of the FPA shown in FIG. 1, and further illustrates focus, tilt and tip control mechanisms;

FIG. 10 sets forth a table of expected operating characteristics of one miniature IR camera constructed according to the invention;

FIG. 11 illustrates a representative parametric trade-off table used by a computer in analyzing system performances of an IR camera constructed according to the invention;

FIG. 12 shows a representative singlet optical prescription suitable for use with a camera constructed according to the invention;

FIG. 12C shows a performance trade-off table used to determine one optimal lens configuration for a camera of the invention;

DETAILED DESCRIPTION OF THE DRAWINGS

Figure 3A:
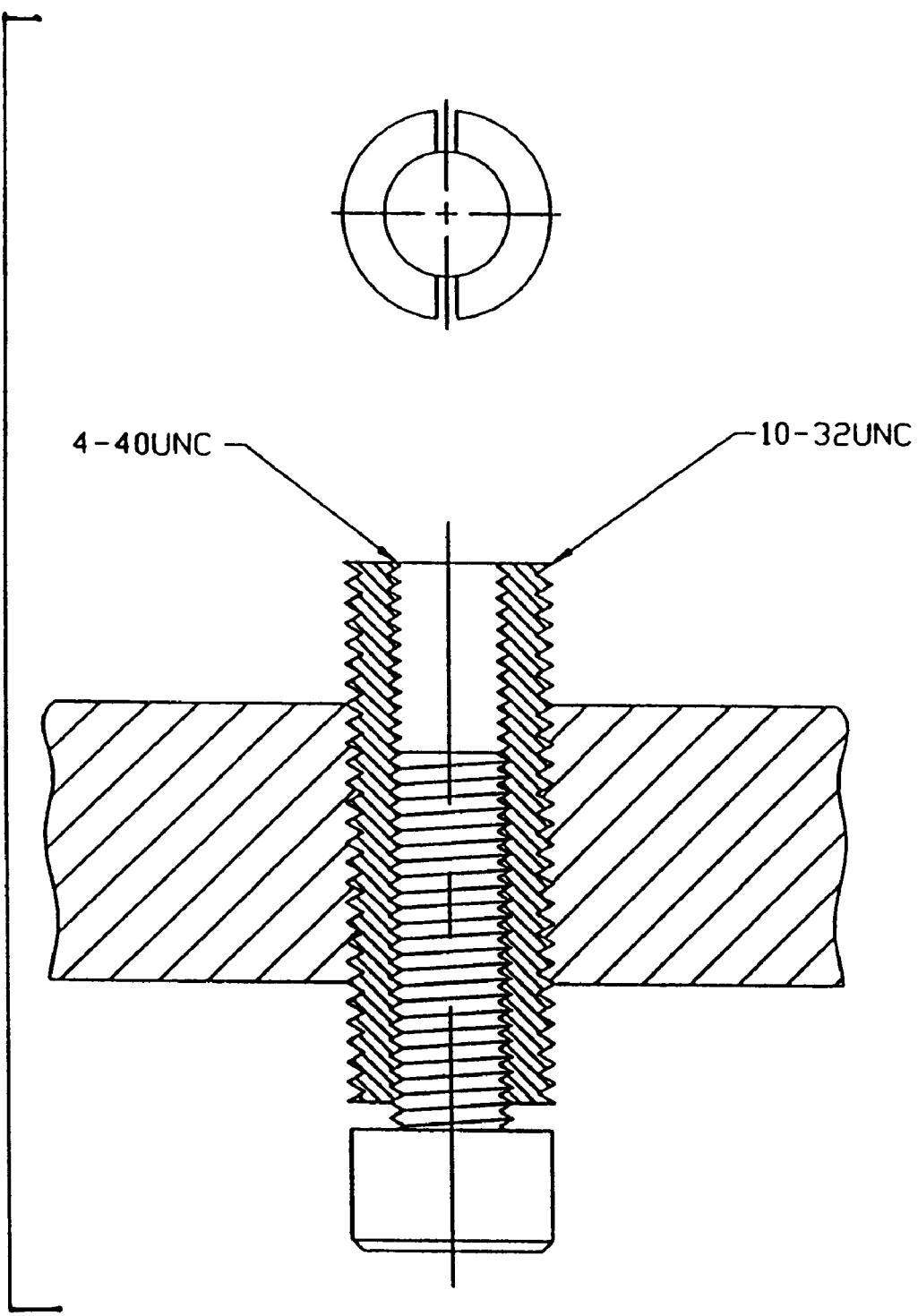
FIG. 3A shows a cross-sectional view of a differential screw mechanism used in accord with the invention.

FIG. 1 shows a schematic view of a miniaturized uncooled camera 10 constructed according to the invention. A compound lens 12 (here shown as a single lens for ease of illustration) collects infrared energy 14 from a scene 16 and images the scene onto a two-dimensional uncooled focal plane array (FPA) 18 with an optical f-number $\theta$. The FPA 18 typically includes a semiconductor substrate and, preferably, integrated circuit architecture within the substrate for processing signals from the FPA detectors.

In the preferred embodiment of the invention, the FPA is an array 20 of microbolometers, such as shown in the top view of FIG. 2. The array 20 includes a plurality of detector pixels 22, each pixel manufactured as a microbridge such as described in U.S. Pat. No. 5,286,976. These microbolometers are manufactured directly onto the substrate by known methods. In operation, the camera 10 takes one frame of data corresponding to an array of data values, one from each detector pixel 22, for each integration time of the FPA 18. The frames of data are common data constructs known to those skilled in the art in both uncooled arrays and, for example, CCD systems.

The FPA 18 connects through a flexible electronic cable 24 to an electronics module 26 which has, respectively, a read-out section 28 to negotiate and control the flow of data between the FPA 18 and the module 26, a calibration section 30 which provides for selective calibration of signals from the FPA 18 in accord with techniques described herein, and a signal processing section 32 to provide as-needed signal manipulation of data acquired from the FPA 18, such as to reduce unwanted spurious signals or to make image enhancements.

The camera 10 preferably mounts within a suitable housing 34, here shown with a dashed outline, which structurally connects the FPA 18 to the module 26 and which protects the camera 10 from environmental effects such as rain and snow. The cable 24 is thus a flexible "tether" which permits nearly unlimited reconfiguration of the FPA 18 relative to the module 26 and within the housing 34. In the preferred embodiment of the invention, the housing 34 is either the airplane body or a pod that can be flown within an unmanned airplane. The internal configuration of such a housing is, therefore, dependent upon the manufacturer or the agency specifying the pod or airplane. Accordingly, the tether 24 permits efficient reconfiguration of the FPA 18. For example, the housing 34 of FIG. 1 illustratively has a narrow sensor head section 36 and a larger compartment section 38. In accord with the invention, the FPA 18 can be manipulated to fit into the narrow head section 36 while the remainder of the electronics is mounted in the back section 38, thus providing compactness in the overall camera 10.

The camera 10 of FIG. 1 is a low powered device; however some power is required. Therefore, a battery 40 is also installed within the housing 34 to provide power to the module 26 and/or to the FPA 18. The cabling tether 24 preferably includes power wiring so as to communicate power to the FPA 18 from the module 26. The tether 24 also communicates control signals to the FPA 18 from the module 26, and further communicates data to the module 26 from the several detectors 22.

In an alternative embodiment, the battery 40 can be replaced with a solar power device known in the art, so long as sufficient power is provided to the module 26 and FPA 18.

In the preferred embodiment, the energy 14 passing through to the FPA 18 is restricted to the wavelengths of interest, such as 2–5 $\mu$m or 8–12 $\mu$m. Accordingly, FIG. 1 also illustrates a spectral filter 42, known to those skilled in the art, that passes only the selected wavelengths of interest within a bandpass. In this manner, when the filter 42 is installed, the camera 10 operates to measure incident IR radiation in the bandpass of interest, e.g., 8–12 $\mu$m. In an alternative configuration, the lens 12 can be coated with the appropriate thin film optical filter, removing the need for the filter 42.

Those skilled in the art should appreciate that other filter techniques are available and envisioned with the invention. For example, the filter 42 can be a filter wheel with a plurality of filters mounted therein so that the camera 10 can monitor IR radiation in a selectable fashion depending upon the filter chosen. Alternatively, the filter 42 can include a continuously-variable filter disc, over wavelength, that is similarly selectable to provide bandpass control. The filter 42 can also include an electro-optic tunable filter, such as known to those skilled in the art, which provides for selectable wavelength transmission.

In the microbolometer FPA design, wavelengths can also be selected on the basis of the cavity dimension within the microbridge. For example, a peak wavelength sensitivity is achieved by selecting a cavity depth, from upper microbridge to lower microbridge, of approximately ¼ wavelength (taking into account the phase shift of reflected light) of the center wavelength in the waveband of interest. Thus, in an 8–12 $\mu$m waveband system, the cavity depth should be approximately 2.5 $\mu$m. Accordingly, this is one of the most preferred techniques to select the wavelengths of interest in accord with the invention.

Enhanced camera performance can be achieved with moderate temperature stabilization of the FPA 18. This cooling generally provides for temperature uniformity along the spatial dimensions of the FPA. Accordingly, and with further reference to FIG. 1, a cooler 44 such as a TE Cooler operates to keep the FPA 18 thermally stable as ambient and operational conditions change. The cooler 44 can also, if desired, operate to keep the filter 42 and lens 12 cool so as to lower their respective thermal emissions. Thermal heat sinks 46 can be used to siphon the heat off of the elements into the cooler 44. As above, the battery 40 provides power to the cooler 44.

In a preferred embodiment, the module 26 includes a sold state memory 47 which is used as a depository for selective information such as (a) storing IR image data acquired from the FPA 18, (b) storing calibration information for the FPA detectors, (c) storing command and control sequences, (d) storing scaling or conversion information such as to convert data acquired from the FPA, and (e) storing user selected preferences, if any. By way of example, the module 26 can include a user interface port 48 that permits certain control (e.g., ON/OFF) and selectable camera configurations by a user of the camera 10. The port 48 can include ergonomic buttons (not shown), for example, and known to those skilled in the art, that control the operation of the module 26. The port connects to the module 26 through a control interface 50. Through the port 48, therefore, a user can select certain desirable operating conditions for the camera 10. One such desirable operating control is the integration time of the detectors on the FPA 18, which controls the contrast of the thermal image acquired by the FPA 18.

The camera 10 also preferably responds to selected remote electromagnetic (EM) information such as radiofrequencies through an antenna 53. The control interface 50 in this embodiment thus includes circuitry capable of converting the EM information to control signals which are responded to by the module 26. By way of example, a remote telemetric signal can be used to turn the camera ON and OFF selectively; or to command a downlink of information to a remote receiver. As such, the antenna 53 is two-way, for receiving and transmitting. Such a configuration has advantages in that, for example, a camera mounted within a remotely piloted vehicle can be turned ON remotely and then asked for a downlink of data such as the current frame of information. A user on the ground can, therefore, review the frame of thermal information in near real-time and assess the scene 16 as viewed by the camera 10.

Those skilled in the art will appreciate that uncooled detectors such as within the FPA 18 should be calibrated in order to operate effectively. Accordingly, the invention provides for several calibration techniques, each of which can be used to acquire digital calibration data that is stored for calibration purposes within the memory 46. In the simplest technique, a digital calibration frame is acquired and stored permanently and used each time for subsequent calibration. Therefore, in this aspect there is no need for active manipulation of the camera; rather the calibration data is always available on demand.

In another technique, the housing 34 is controlled so as to temporarily rotate the camera's field of view so that the sky is imaged onto the FPA 18. By way of example, suppose that the housing or pod 34 represents the airplane body or is mounted within the airplane. Typically, the scene 16 viewed by the camera 10 is the ground over which the airplane travels, similar to an infrared line scanner except that there is no mechanical scanning. In the calibration cycle, therefore, the plane inverts, temporarily, so that the camera 10 views a sky scene 16. For one or more data frames of acquisition, the camera 10 views the sky and stores calibration information and preferably averages the calibration information to provide a uniform background of known approximate temperature. This calibration information is stored either in the memory 47 or in the calibration section 30. The calibration section 30 includes processing capability which processes the calibration information and which thereafter controls the signal outputs from the detectors within the FPA 18 in order to acquire useful IR imagery. By way of example, the calibration section 30 can be used to apply gain and offset to each detector within the FPA 18 such that one temperature appears approximately the same to each other detector. As such, when viewing a uniform temperature scene, a frame of data is substantially uniform. This calibration cycle can be triggered, for example, by a gravity switch, by a command remotely communicated to the airplane, by a mechanical shutter which closes when the airplane is tipped, or by other triggering mechanisms known to those skilled in the art.

Figure 4:
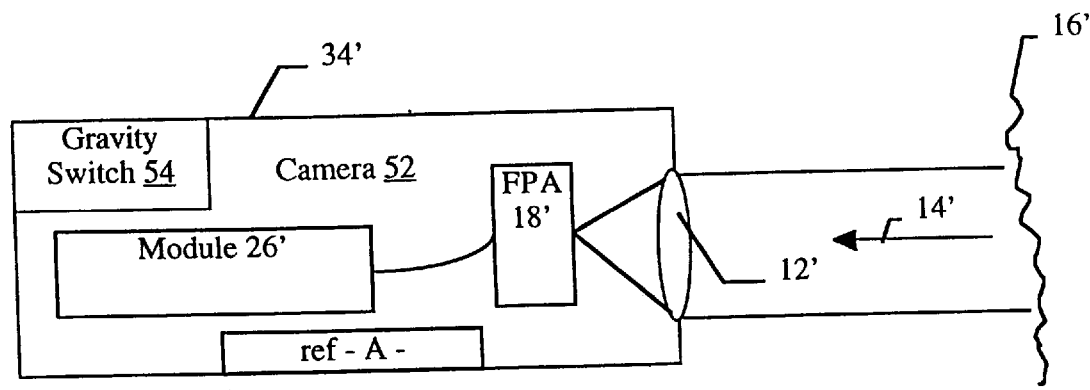
FIGS. 4 and 4A show a camera constructed according to the invention and including a gravity switch used to obtain calibration data.
Figure 4A:
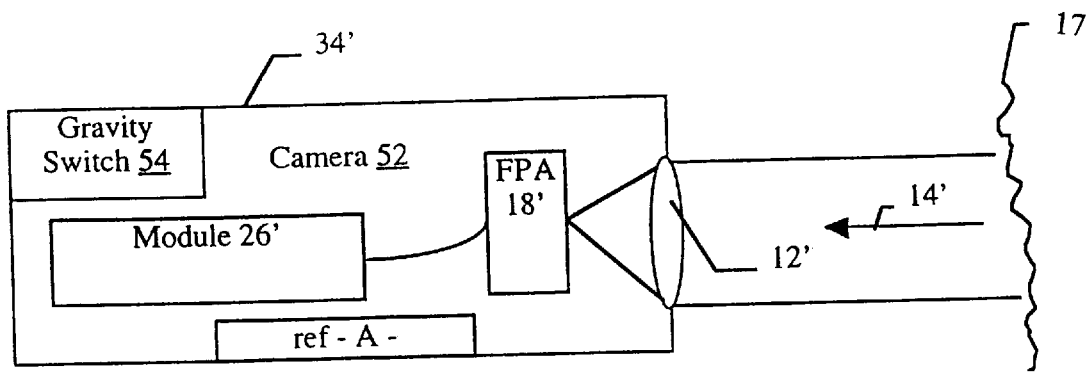

For example, and with reference to FIGS. 4 and 4A, a camera 52 with a lens 12', FPA 18' and module 26'—similar to the camera 10 of FIG. 1—has a gravity switch 54 mounted with the housing 34' which detects an inverted condition such as when the camera is upside down, shown in FIG. 4A, as compared to a non-inverted condition, shown in FIG. 4. When the switch 54 detects the inverted condition, a calibration cycle is triggered and the camera 52 views a substantially uniform temperature sky scene 17. More particularly, the switch 54 initiates a calibration processing cycle within the camera's calibration section, such as the section 20 of FIG. 1. When the camera 52 is again placed in a non-inverted condition, FIG. 4, the gravity switch again triggers, terminating the calibration cycle within the calibration section, and the camera again views the scene 16'. Note that the surface "Ref -A-" is marked so as to illustrate the inverted and non-inverted conditions of FIGS. 4 and 4A.

In another embodiment, the switch 54' is not required. Rather, the shutter 56 is controlled by operation of its own weight. In particular, when the camera 52 inverts, such as in FIG. 4C, the shutter 56 slides into place to block the IR radiation 14'. In the non-inverted condition, FIG. 4B, the shutter 56 slides open so that the FPA 18' can view the scene 16'. A local switch 54" can be used to detect the closing and opening of the shutter 56 to provide a signal which triggers the calibration cycle by the calibration processing section of the electronics module. This calibration cycle includes, for example, the storing of calibration data within the calibration section or other internal memory. Alternatively, the calibration cycle is triggered by a remote signal received at the camera. For example, the pod or airplane carrying the camera can be commanded to invert, thereby closing the shutter 56, and the calibration cycle can be initiated and/or terminated from a remote signal (e.g., telemetric data).

One other calibration technique includes an integration of several frames of imagery of the earth, which is approximately 300° Kelvin. In particular, typically the camera 10 views a scene 16 on the ground. This is true whether the camera 10 is in an airplane or used in some other thermal imaging application. The camera 10 also generally moves relative to the ground. In an airplane, for example, the camera 10 views a ground scene 16 that constantly changes as the airplane moves over the ground. Accordingly, by integrating and averaging several frames of thermal data, an average uniform scene is generated. This average uniform scene, again, is stored in the memory 47 or calibration section 30 and is thereafter utilized to compensating detector parameters such as gain and offset. This compensation improves the overall view of the infrared imagery and also provides a more accurate representation of the absolute temperature viewed within the camera's image. This calibration cycle can be triggered by a telemetric command, an on-board timer, or by a gravity switch.

Figure 5:
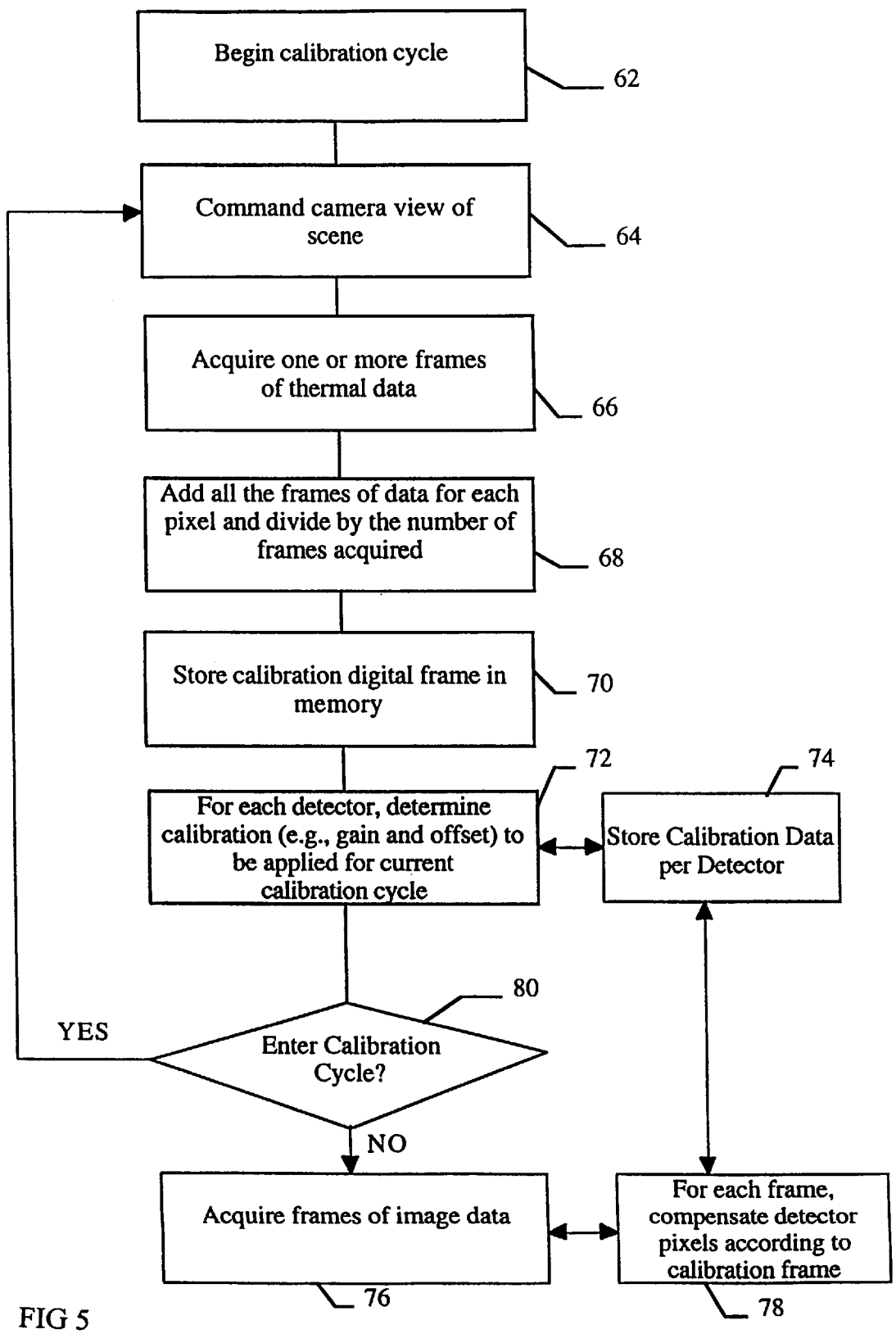
FIG. 5 illustrates a calibration process flow, according to the invention.

The calibration process flow 60 associated with viewing and averaging a sky scene or a ground scene is illustrated in FIG. 5. In FIG. 5, a calibration cycle begins in process block 62 by one of (a) a telemetric command received remotely, such as through the antenna 52, (b) a manual command, such as through the user interface 48, (c) at a predetermined time interval, such as every ten minutes (the electronics module 26 includes a clocking device such as a crystal (not shown); and the calibration section in this embodiment includes a timing control that counts the clocking cycles and that triggers the calibration cycle at each predetermined time interval), or (d) via the closing of a gravity switch.

Once the calibration cycle begins, the camera 10 is manipulated in process block 64 to view a uniform scene, such as a shutter, or a uniform scene such as the sky or the ground which can be created by averaging successive frames. In the case of a shutter, a weight-activated shutter (see FIGS. 4B–4C) closes to block the incoming IR radiation so that a uniform temperature scene is obtained. In the case of the sky, the camera is physically moved so as to view the sky and a gravity-activated switch triggers the calibration cycle (see FIGS. 4–4A). In the case of the ground, typically no action is required at the process block 64 since the scene itself is integrated to obtain a uniform scene approximation.

Once the camera is in position to take calibration data, one or more frames of calibration data are acquired in process block 66. In the case of the sky, potentially fewer frames are needed to obtain a useful calibration since the sky is often clear or uniformly covered with clouds. In the case of the ground, several frames, typically ten or more, are required for calibration frames since the ground typically has high contrast that varies spatially. In the case of the shutter, typically only one or two frames are required for calibration frames since the shutter has substantially uniform temperature.

In process block 68, the calibration frames are summed and divided by the number of frames acquired during the frame acquisition of process block 66 to obtain a calibration frame. This frame is stored in memory in process block 70. The calibration section 30 of FIG. 1 thereafter uses the stored calibration frame, in process block 72, to determine the calibrations, such as gain and offset, to be applied to each detector within the FPA 18. This data is stored in process block 74 as, for example, a look-up table (LUT).

During operation, the camera 10 takes frame after frame of thermal image data, shown in process block 76, and, for each frame, the calibration data is applied to the detectors of the FPA 18 in process block 78 so as to provide effective IR imagery. In the even that another calibration cycle is initiated remotely, manually, by inclined flight, or by periodic timing of the calibration section 30, then the calibration cycle is started all over such as shown in process block 80.

Figure 4B:
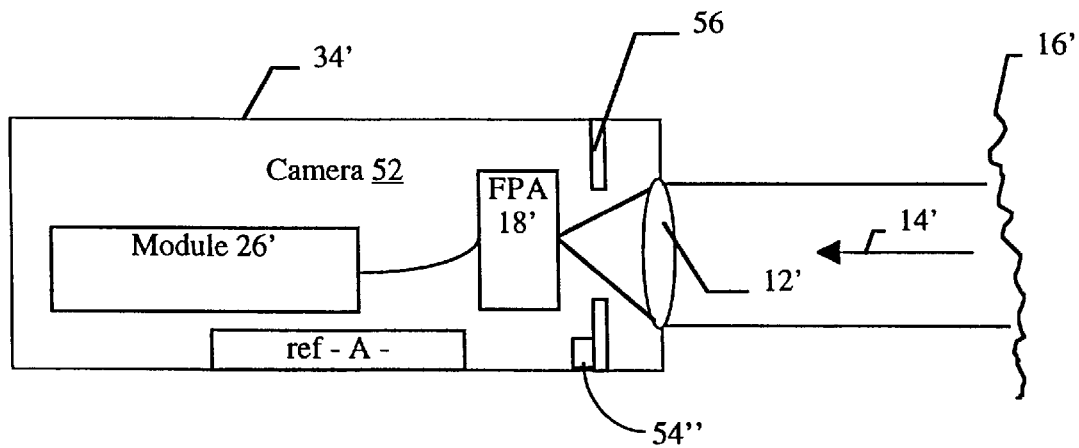
FIGS. 4B and 4C show a camera constructed according to the invention and including a switch used in conjunction with a mechanical, gravity controlled shutter to obtain calibration data.
Figure 4C:
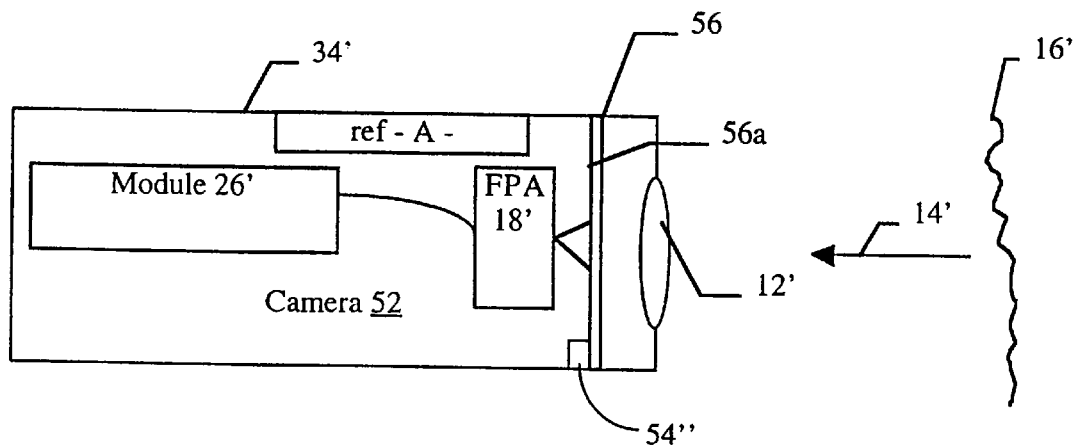

One other calibration technique of the invention includes using a manual cover which is placed over the lens 12 and then the user either (a) triggers the manual calibration cycle at the interface 48 or (b) tilts the camera to trigger a switch such as a gravity switch 54, FIG. 4, or a shutter/switch combination 56/54", FIG. 4B.

In order to protect the optical lens 12, FIG. 1, a sacrificial IR-transmissive cover 82 is preferably placed over the lens 12. The cover 82 is transparent in the IR waveband so that the camera 10 can be used and re-used without substantial degradation of the primary lens system 12. That is, the cover 82 can be made relatively inexpensively, as compared to the lens system 12, and can be replaced frequently or as-needed.

The FPA 18, the module 26, and the cooler 44 each generate heat that is best dissipated to outside of the camera 10. As illustrated, one method for doing this is through a heat sink 84 which vents to outside of the housing 34 (or alternatively is part of the housing 34) and which is thereby cooled by convective cooling. The heat sink 84 need not, and preferably does not, connect between the FPA 18 and module 26 but rather dissipates heat directly from the FPA 18. The heat pipe 84 can represent separate sinks for each element 18, 26.

Figure 6:
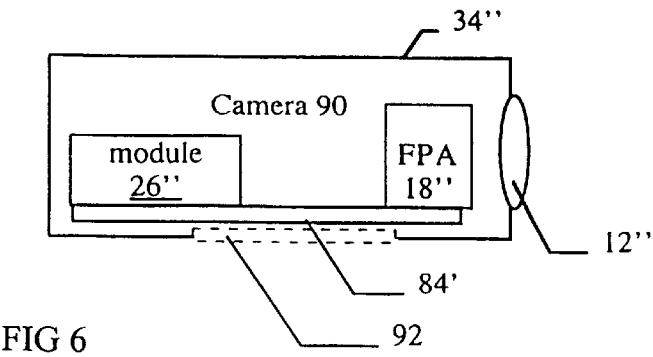
FIGS. 6 and 6A illustrate alternative cooling techniques according to the invention.
Figure 6A:
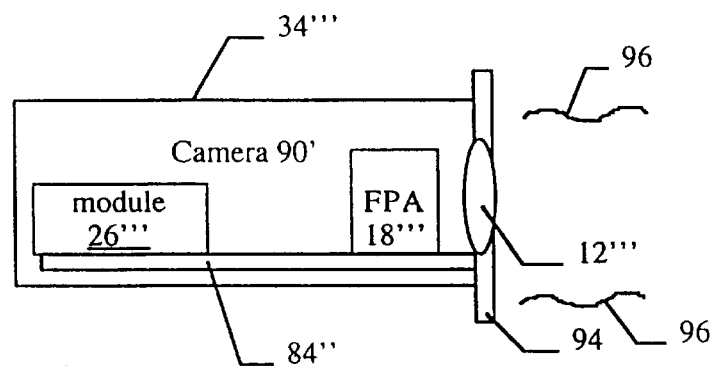

FIGS. 6 and 6A illustrate alternative cooling techniques according to the invention. In FIG. 6, a camera 90, similar to camera 10 of FIG. 1 is cooled through venting. Specifically, the housing 34" of camera 90 is vented through vent 92 to atmosphere so as to cool the heat sink 84'. In FIG. 6A, the camera 90' is cooled through a heat sink 84" which is thermally tied to an external radiator 94 that is subjected to an air stream 96 such as wind outside an airplane.

With further reference to FIG. 1, the invention preferably includes mechanisms to focus the light energy onto the FPA 18, and to tip and tilt the FPA 18 so as to achieve best focus. Because the FPA 18 is mounted to the housing 34, the multiple screws 100 which attach the FPA 18 to the housing 34 can also be used as tilt, tip and focus adjustment. With reference to FIG. 3, the screws 100a–100c are arranged such that several functions are achievable: focus by moving the FPA 18 towards or away from the lens 12; tip, by adjusting one screw 100 relative to another along one axis 102; and tilt, by adjusting one screw 100 relative to another along another axis 104. Preferably, the screws 100 are differentially threaded mechanisms such as shown in FIG. 3A to provide accurate movement to about 0.0005".

Note that the use of the screws 100 in FIGS. 1 and 3 provide for compactness since they function with more than one capacity: they attach the FPA 18 to the housing 34, and they operate to provide optical focus. The module 26 and battery 40 can also be mounted with similar screws 100', though it is unnecessary to provide for tipping, tilting or other adjustment of these elements. Rather, the screws 100' can be effectively used to seal the housing 34 around the camera 10.

Figure 7:
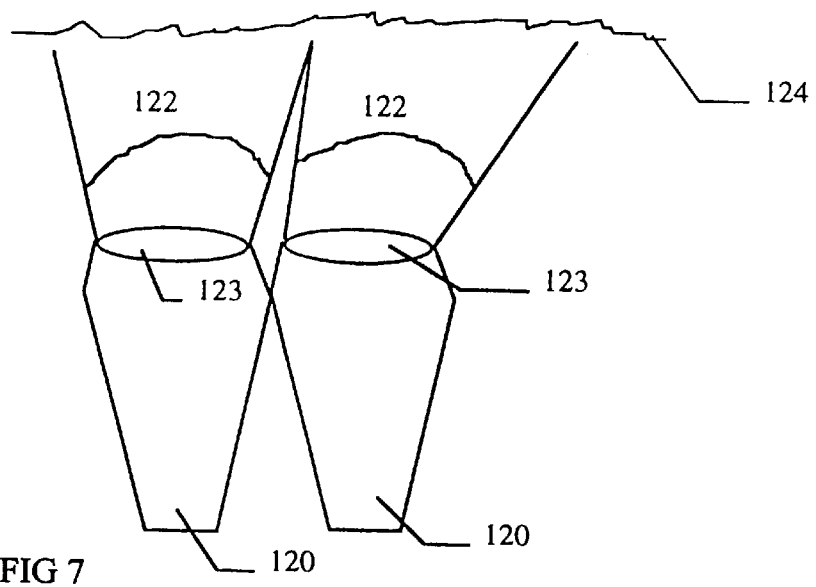
FIG. 7 is a schematic illustration of two miniature IR cameras, constructed according to the invention, and combined to form a composite IR sensor with adjacent fields of view so as to increase the sensor field of regard.

Because of the lightweight and compact nature of a camera constructed according to the invention, it is practical and beneficial to combine two or more cameras with overlapping fields of view (FOV) so as to expand the overall field of regard of a combined camera sensor. FIG. 7 illustrates this feature. In FIG. 7, two cameras 120—each similar to the camera 10 of FIG. 1—are arranged side by side and such that the FOVs 122 of the optical systems 123 view a larger portion of the scene 124 as compared to the FOV 122 of a single camera 120. Alternatively, a single electronics module can be used for both cameras 120 provided there is sufficient memory and control to accommodate both FPAs.

EXPERIMENTAL RESULTS and TESTS

An uncooled IR FPA from Lockheed-Martin IR Imaging Systems (formerly Loral Infrared and Imaging Systems) was configured into a miniature airborne camera as a drop-in replacement for the existing TV camera used on the Pointer HL-UAV, a hand-launched, unmanned aerial vehicle from AeroVironment, Inc., of Simi Valley, Calif. The IR FPA was configured with an electronics module into a miniature, lightweight, camera package that facilitates an acceptable flight profile. The FPA and electronics consumed less than 8W, at a selectable voltage ranging from 2V to 30V. This power requirement is compatible with current CCD TV cameras and the 30V supply on the Pointer. The output from the FPA is standard NTSC composite TV signal, also compatible with the existing Pointer transmitter.

Figure 8:
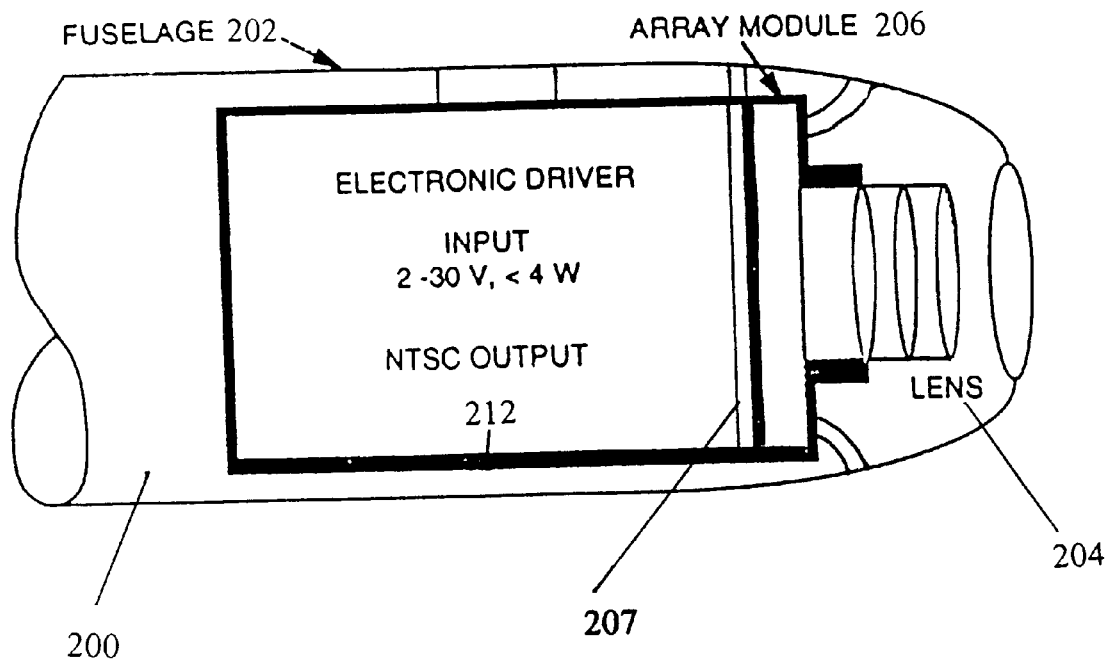
FIG. 8 is a schematic illustration of a miniature IR camera, constructed according to the invention, and arranged within a Pointer fuselage.

FIG. 8 shows a schematic illustration of an IR camera 200 constructed according to the invention and arranged within the Pointer fuselage 202. The total camera weight was less than 24 oz., including the lens 204, FPA array module 206, electronics module 208, and housing 212. A light-weight heat sink 207 is used to help thermally stabilize the IR FPA 206.

The camera 200 preferably includes structure, not shown and known to those skilled in the art, to withstand operating conditions of rain, snow, and fog, as well as incidents of thermal, shock, vibration, and EMI.

Figure 9:
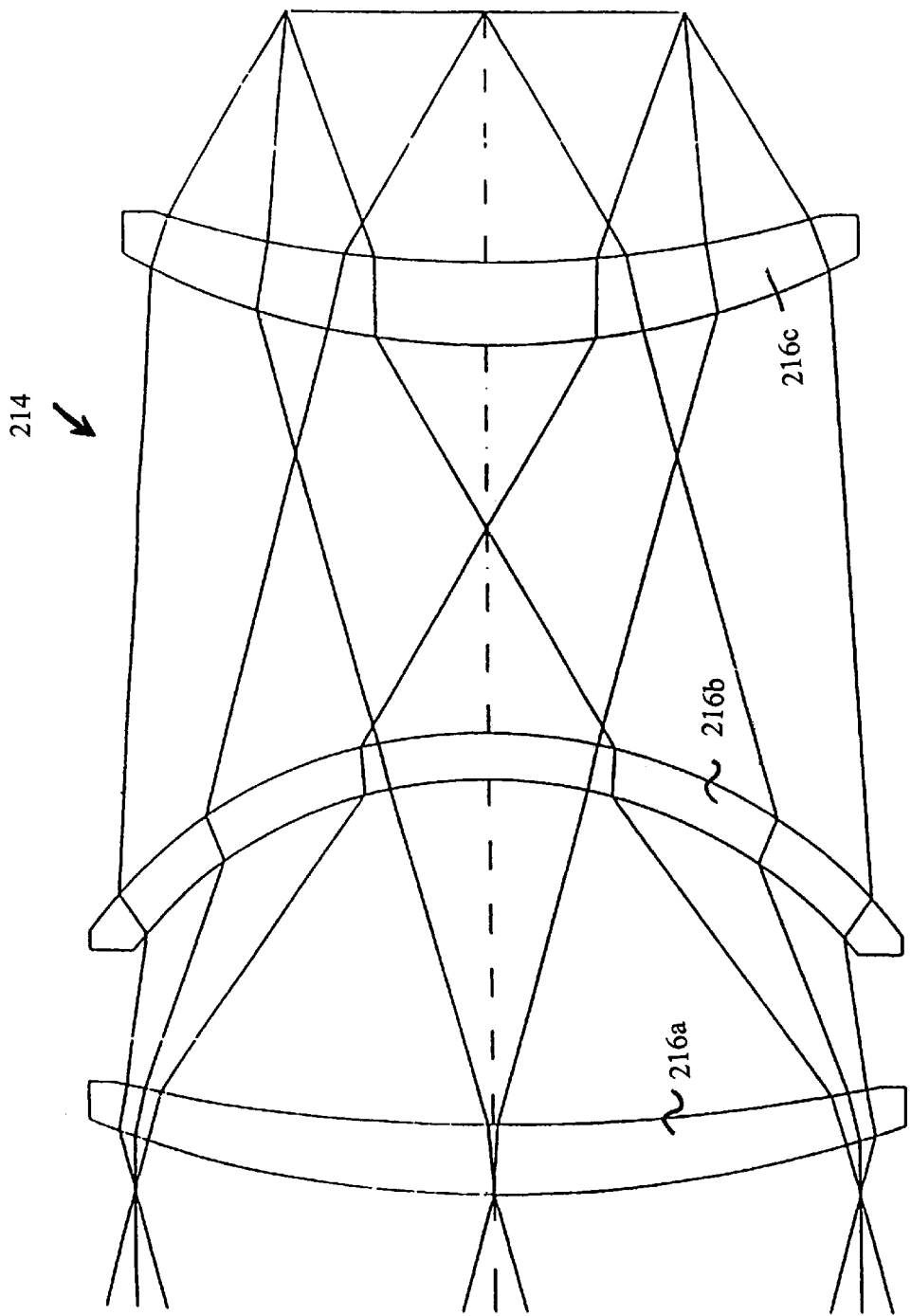
FIG. 9 illustrates one representative lens design suitable for use with a camera constructed according to the invention.
Figure 9A:
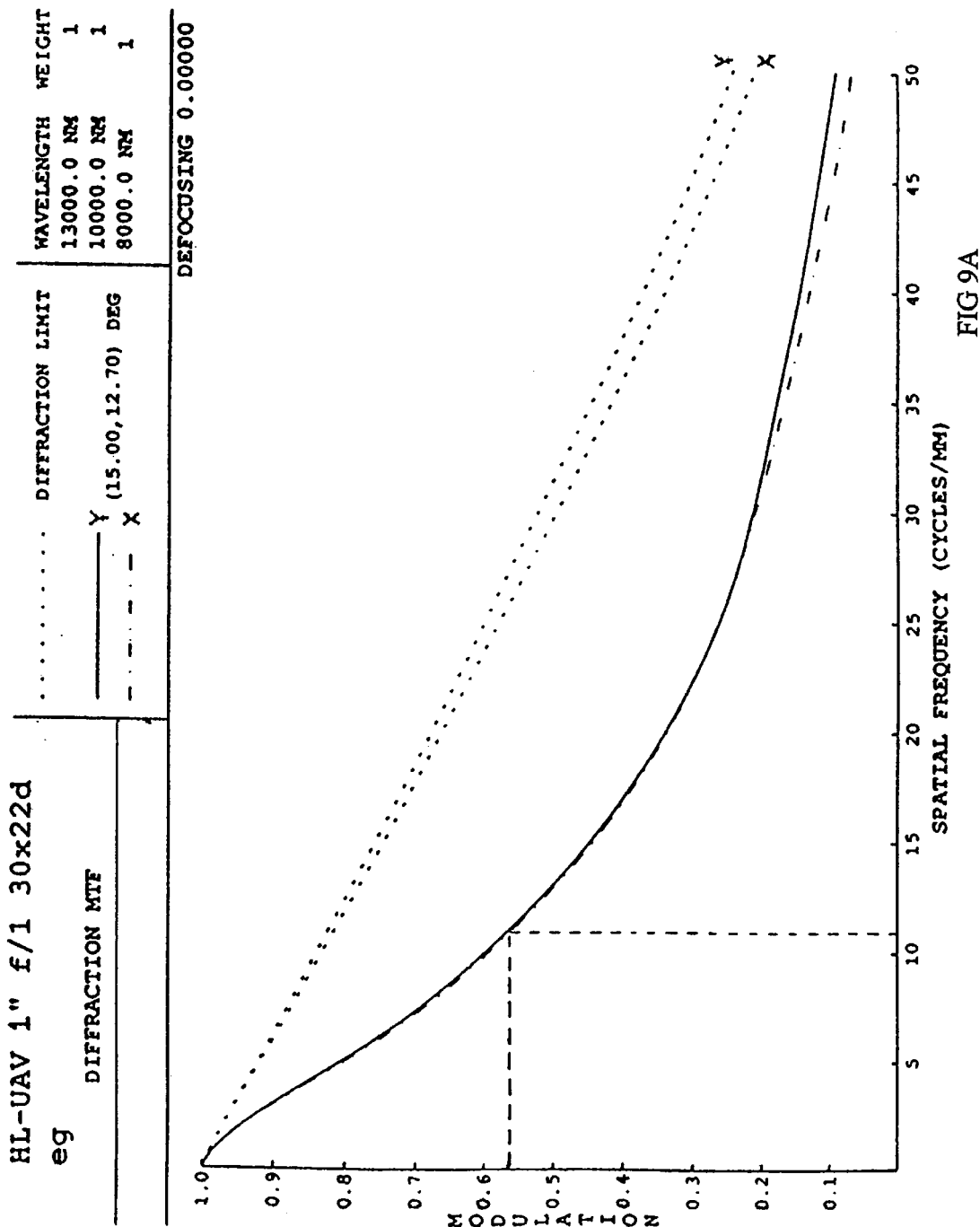
FIG. 9A shows MTF performance characteristics of the lens design of FIG. 9.

In order to minimize the overall weight of the camera 200, FIG. 8, the optical design of the lens 204 was limited to 3-elements. One such 3-element design 214 is shown in FIG. 9. These lenses 216a–c provide a 22°×30° field of view, compatible with the existing Pointer CCD camera and which reduces operator disorientation when switching between visible and IR cameras. The MTF of the lens system 212 is shown in FIG. 9A. At the limit of resolution of the array, 11 cycles/mm, the MTF of the lens system 214 is 50%. The weight of the three lenses 216a–c are 8 oz., which puts it within the payload capacity of the Pointer.

Figure 11A:
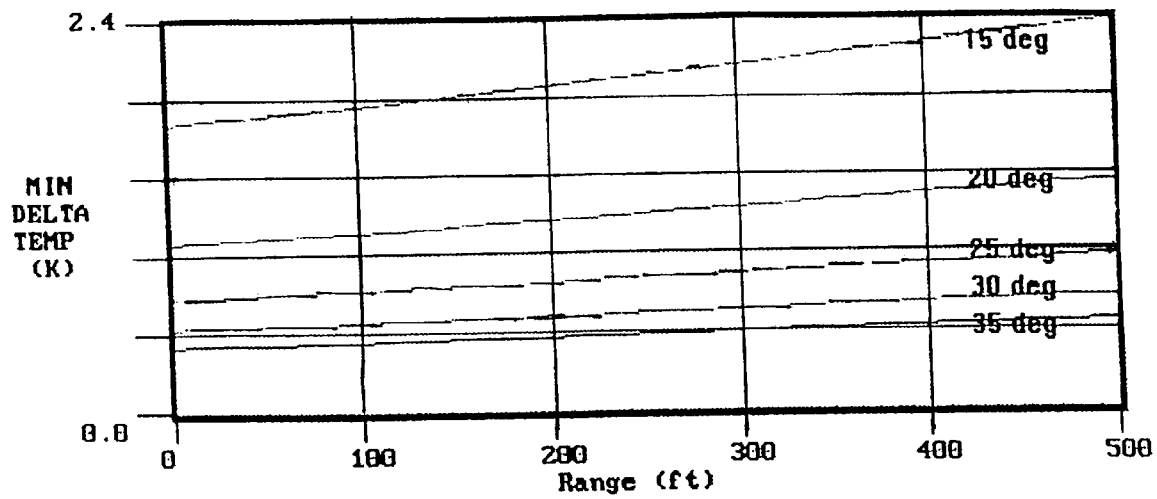
FIGS. 11A and 11B show representative temperature performance curves generated by a computer relative to certain parametrics of the data in FIG. 11.
Figure 11B:
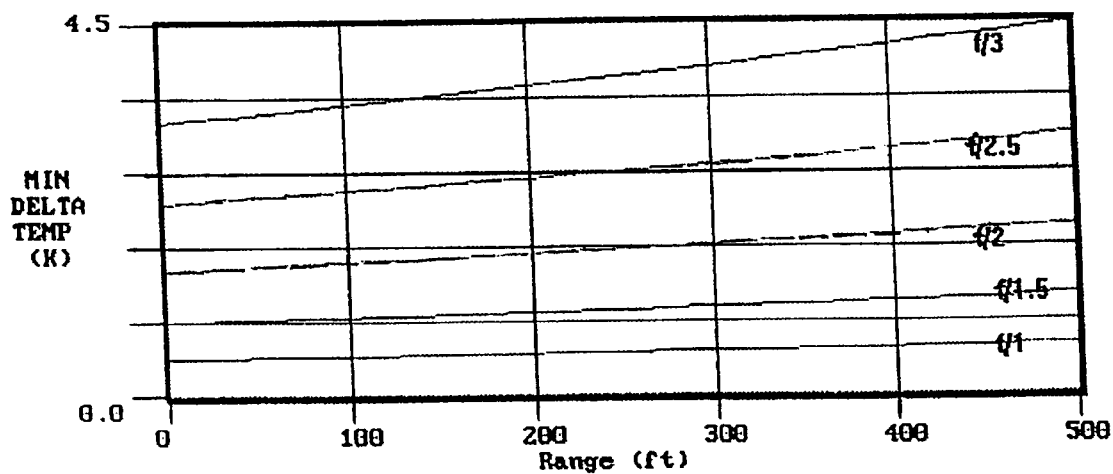

The system 200, FIG. 8, is sensitive to less than about 0.5° C. temperature difference (<0.5° C. MRTD at 200 ft.). FIG. 10 lists certain other, approximate performance characteristics of a camera 200 constructed according to the invention. These characteristics were modeled on a computer operating in a DOS environment. FIG. 11 illustrates a representative screen from the computer and further illustrates certain system parameters used in conjunction with the analysis. For example, the data of FIG. 11 includes parameters for the lens transmission, field of view, F#, filter bandpass, atmospheric transmission, target temperature, target emittance, probability of detection, detector size and sensitivity, frame rate and system noise. At the bottom of FIG. 11 there is calculated the minimum detectable temperature at 200 ft, as well as the maximum distance (1316 ft) that a 1° C. temperature difference can be detected. The system model of FIG. 11 also creates design performance curves showing the dependence of the minimum detectable temperature on field of view and on F-number. FIGS. 11A and 11B show two typical graphs, indicating that a wider field of view and lower F-number provide better performance.

Figure 12A:
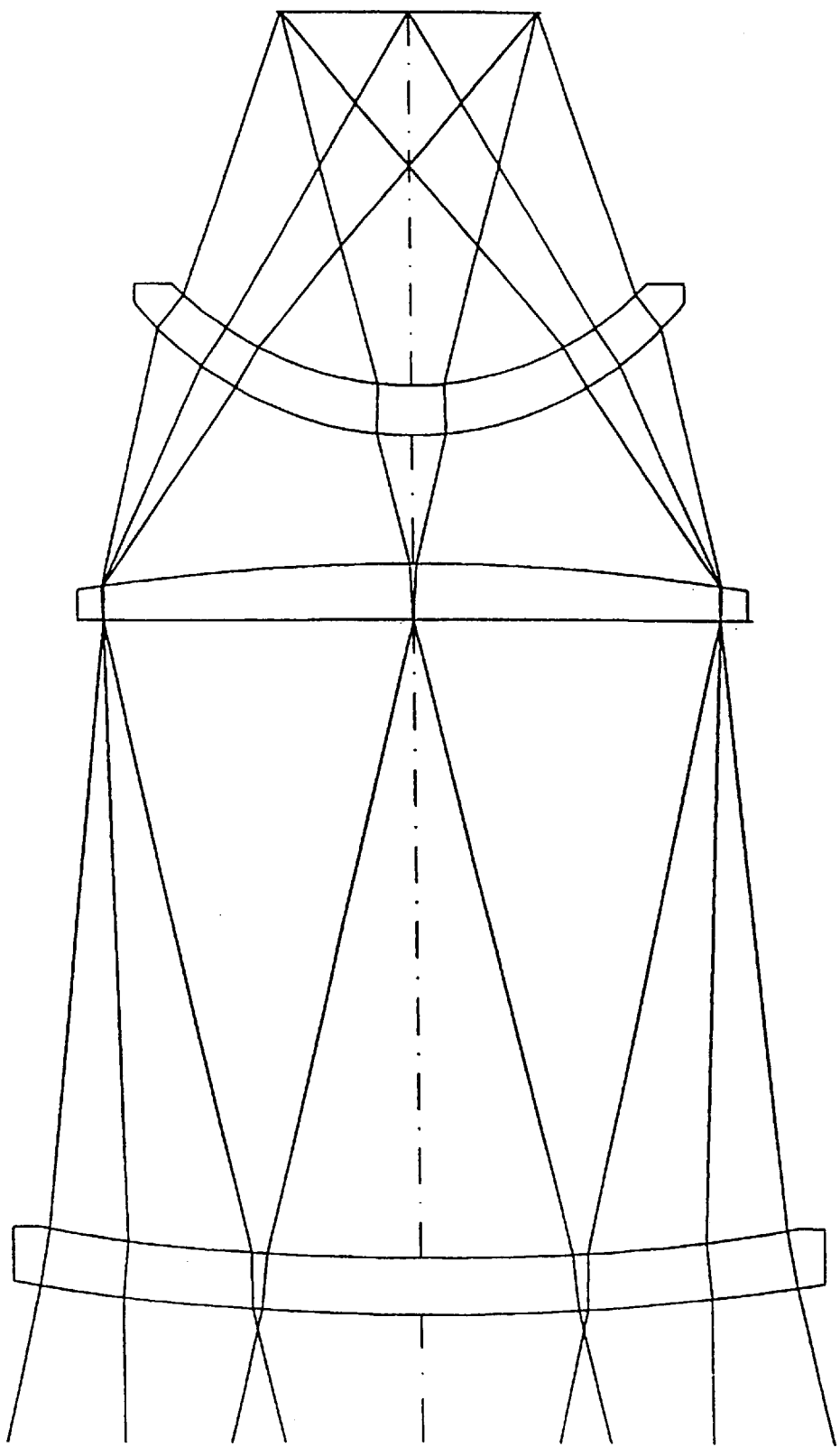
FIGS. 12A and 12B show alternative optical designs suitable for use with a camera constructed according to the invention, including a straight lens configuration and a folded lens configuration.
Figure 12B:
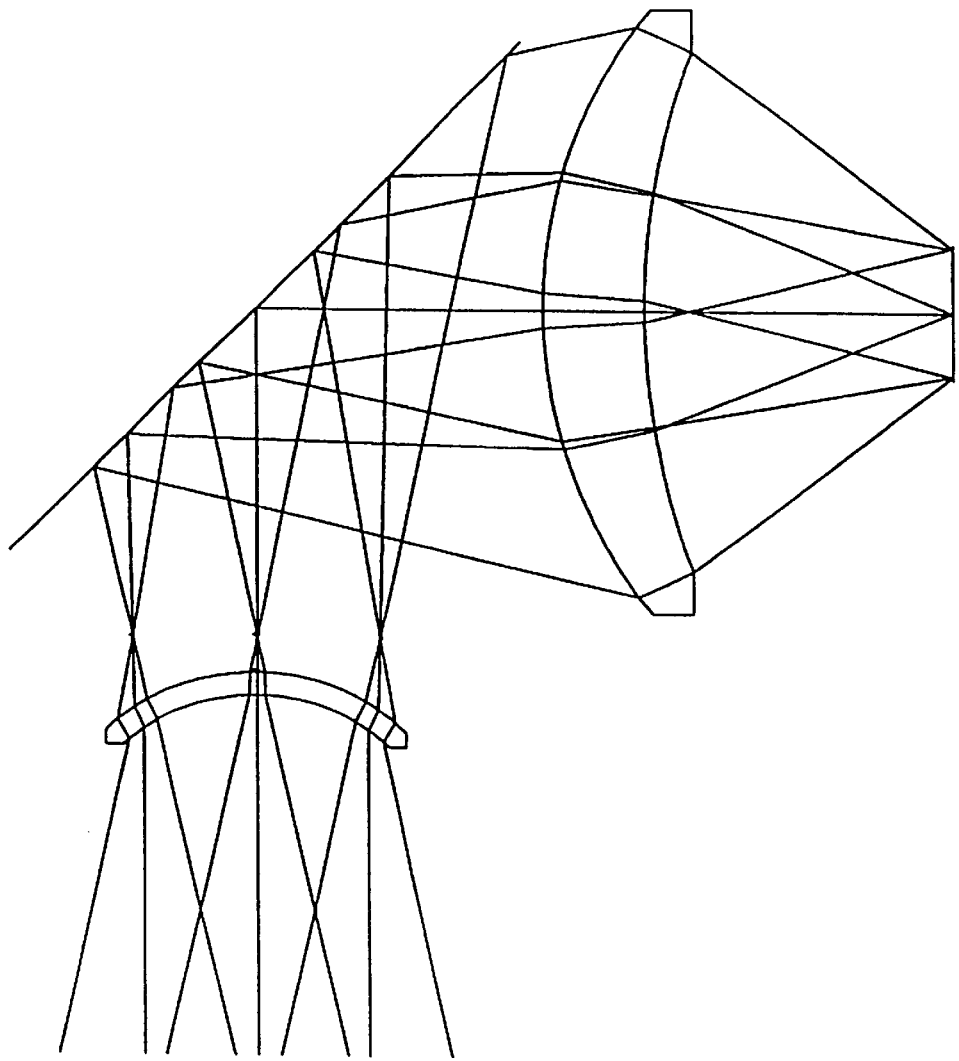

Three primary lens designs were considered for installation as the lens system 204 of FIG. 8: an optical singlet, a triplet, and a doublet with a fold mirror. These systems are set forth in FIGS. 12, 12A and 12B, respectively. FIG. 12 shows only the optical prescription of the singlet design; while FIGS. 12A and 12B show representative optical raytrace drawings of the respective lens designs. A trade study was performed in conjunction with the overall optical design process and is illustrated in tabular form in FIG. 12C. Selected conclusions of this trade study are:

Germanium was selected as the best material for the lenses. It gives more refractive power for its weight (n=4), and very low chromatic dispersion, so that the lens system is color corrected over the 8–14 μm spectral range.

The field of view was traded against system size and optical performance. Generally, the narrower the FOV, the better the resolution. However, a smaller FOV requires a longer focal length lens with larger diameter optics, which are heavier and harder to fit into the fuselage. To ensure maximum reconfigurability within the fuselage, a short focal length was used, also resulting in a wider FOV and better temperature detectivity.

The table of FIG. 12C lists the performance characteristics, and estimated cost to produce each lens design. There are two basic lens configurations: a conventional straight barrel design, such as shown in FIG. 12A, and a folded design with a mirror, such as shown in FIG. 12B. Each design is categorized by the number of elements, and the number of aspheric surfaces on those elements. The definitions of the parameters in the table of FIG. 12C are:

Lens Weight

This includes the weight of the Germanium material of the lens, and the weight of an aluminum fold mirror if required. It does not include the weight of a lens barrel and mount.

MTF at cutoff

This measure serves as a ruler to compare the resolving power of each lens. It characterizes the ability of the lens to reproduce details of the scene within the ability of the detector array to reproduce that scene.

In a typical lens system, the image resolution rolls off towards the edges of the picture; so we typically examine the MTF in the worst location at the edge of the image (e.g., a 15° field angle). Since the pixel array of the Lockheed-Martin FPA has a 0.046 mm pixel spacing, it can only faithfully reproduce features in the image larger than 0.092 mm, which is equivalent to a 11 cycle/mm modulation. (by definition the Nyqist cutoff=1/(2×pixel period)). The lens performances were evaluated from 0 to 11 cycles/mm modulation. Therefore, comparisons were made at 11 cycles/mm relative to the MTF of a diffraction limited lens with the same F#, and expressed as a percentage. The MTF numbers used are derived from the optical design software.

Det. Delta T (detectable delta temperature)

This figure describes the smallest temperature difference between the target and the background that the camera can detect at a range of 200 ft. It takes into account all the factors in the system that affect the cameras' ability to see. These include the temperature and emissivity of the target, the transmissivity of the atmosphere, the transmission of the lens and filters, the F# of the lens, the spectral sensitivity of the pixels, the frame rate of the camera, and the optical and electrical noise in the system. It also assumes a 99.9% probability of detecting the target on one look (one TV frame).

As shown in the table of FIG. 12C, a number of different optical systems were considered. Starting with a baseline system with 3 elements and 4 aspheres, the design was changed to reduce the number of elements, and the number of aspheric surfaces. Folded designs were also investigated with 2 and 3 lens elements and a mirror.

One of the biggest design drivers considered in the trade-off of FIG. 12C is the ability of the IR camera to conveniently fit into the Pointer; be light enough for the Pointer to fly; and have sufficient resolution to produce a reasonable image. From our CAD model, it is apparent that the straight lens system would fit into the fuselage, but could not be tipped down with the desired 30° depression angle. Therefore, a mirror-folded optical system such as FIG. 12B was chosen for the Pointer.

From the trade-off table shown in FIG. 12C, there are four optical systems with over 90% MTF at cutoff: three straight systems, #4, #15 and #16, and one folded system #8.4. Note that of the three straight systems, two of them weigh only 1.1 oz. One of these has only one asphere, making it easier to manufacture. Of the folded designs, #8.4 through #8.1, have a reasonable MTF. These 4 lenses are the same design with different F-numbers. As the F-number increases, the MTF improves, and the weight decreases; however the minimum detectable delta T is sacrificed. Design #8.4 is the lightest of the folded systems, weighing 4.6 oz., with 92% MTF.

Figure 13:
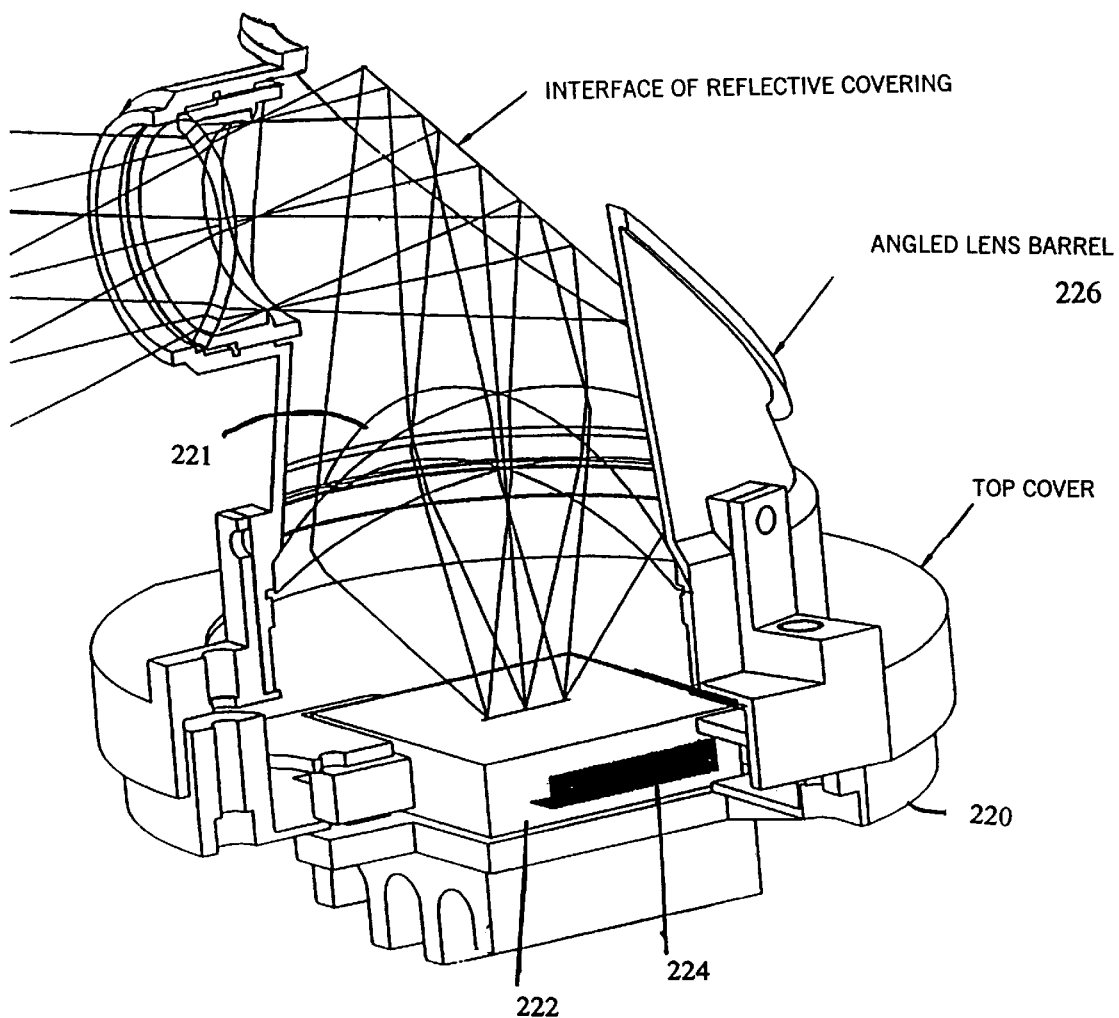
FIG. 13 illustrates, in a perspective, partially cut-away view, a folded lens configuration and associated housing suitable for use with a camera constructed according to the invention.
Figure 13A:
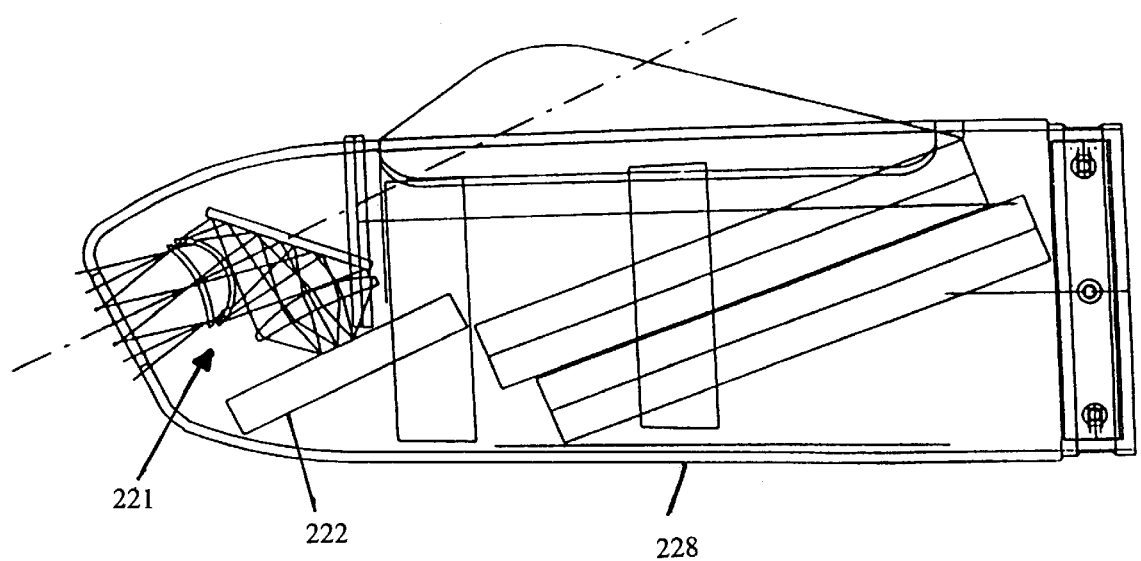
FIG. 13A shows a cross-sectional side view of a camera and fuselage constructed according to the invention.

FIG. 13 illustrates a perspective, partially cut-away view of a housing 220 developed according to the invention and that holds the IR lens 221 into position using an easily manufacturable configuration. An array mount 222 allows for the independent exchange of the heat sink 224. The lens mount 226 permits easy exchange with other, replacement lenses. FIG. 13A shows the system of FIG. 13 arranged within the Pointer fuselage 228.

Figure 14:
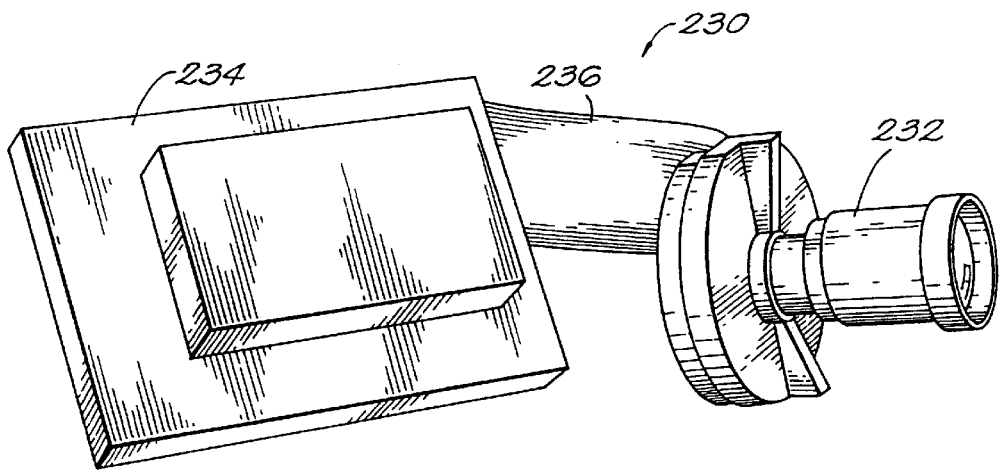
FIGS. 14 and 14A show representative IR camera systems, constructed according to the invention, with interchangeable optical configurations.
Figure 14A:
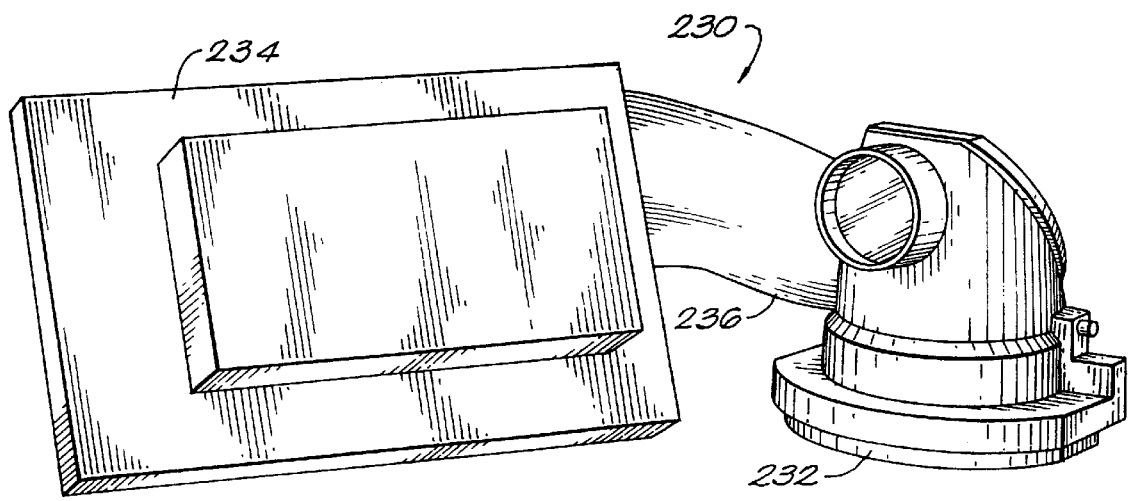

A prototype, miniature IR camera 230 constructed according to the invention is shown in FIGS. 14 and 14A. The camera 230 includes the camera body 232 with two interchangeable lenses (straight and folded optical designs, FIGS. 14 and 14A, respectively), an electronic driver 234, and ribbon cable 236.

Figure 15:
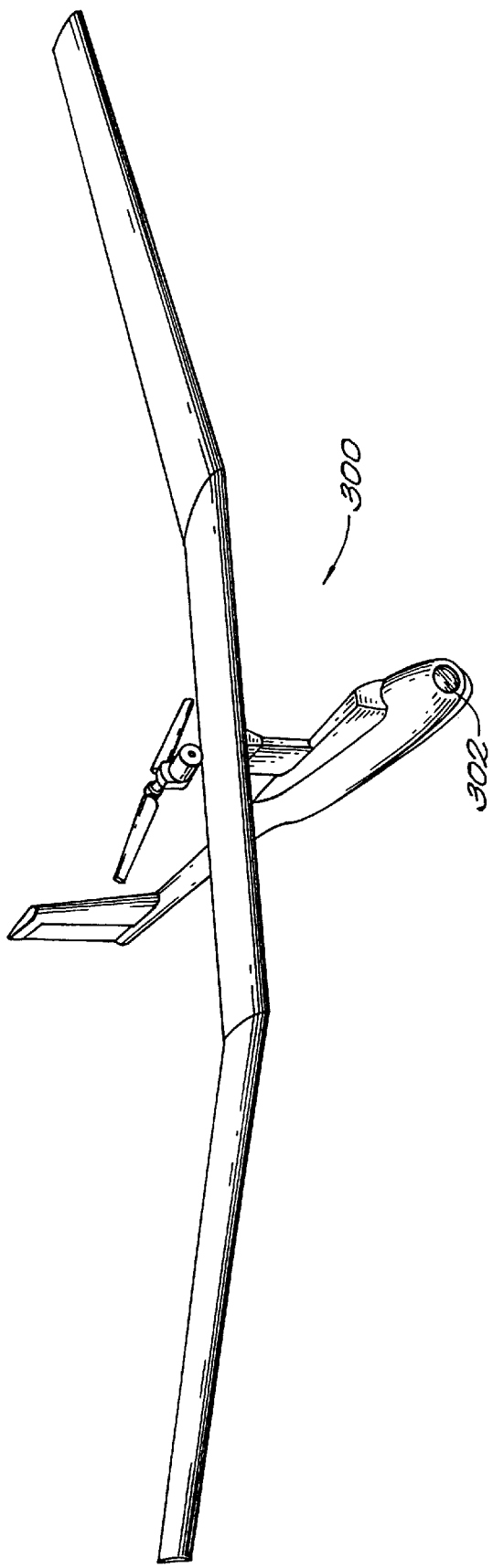
FIG. 15 shows a UAV constructed according to the invention and which houses an IR camera constructed according to the invention.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense. For example, those skilled in the art should appreciate that the tether 24 of FIG. 1 can be replaced with an RF or telemetric link between the module and the FPA as long as power is provided to the FPA. Further, the invention was discussed primarily i n conjunction with an unmanned aerial vehicle (UAV) such as illustrated in FIG. 15. Specifically, FIG. 15 shows a UAV 300 with a forward aperture 302 which provides an optical aperture to an IR camera system constructed according to the invention. However, those skilled in the art should appreciate that the IR camera of the invention can be used in other systems such as in conjunction with a security reconnaissance system.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. A miniaturized IR camera for mounting within a vehicle, comprising a two dimensional uncooled FPA, a compound lens for imaging IR radiation onto the FPA, means for adjusting a distance between the lens and the FPA to adjust focus, an electronic module that controls camera read out, calibration, and signal processing, and means for flexibly coupling the FPA to the module wherein the module and the FPA are separately reconfigurable within the vehicle.

2. A camera according to claim 1, wherein the uncooled FPA comprises a two-dimensional array of microbolometers.

3. A camera according to claim 1, wherein the uncooled FPA comprises a two-dimensional array of ferroelectric devices.

4. A camera according to claim 1, further comprising one or more batteries to power the camera.

5. A camera according to claim 1, wherein the FPA is constructed and arranged so as to respond to radiation in the 8–12 micron region.

6. A camera according to claim 1, wherein the FPA is constructed and arranged so as to respond to radiation in the 3–5 micron region.

7. A camera according to claim 1, wherein the FPA is constructed and arranged so as to respond to radiation in the 2–14 micron region, and further comprising filter means for selecting a waveband of operation within the region.

8. A camera according to claim 7, wherein the filter means comprises means for filtering the region to one of (a) 8–12 microns, (b) 3–5 microns, and (c) 1–2 microns.

9. A camera according to claim 7, further comprising means for cooling the filter means so as to reduce background flux from the filter means.

10. A camera according to claim 1, further comprising means for cooling the lens to reduce background flux from the lens.

11. A camera according to claim 1, further comprising memory means for storing selective information including at least one of (a) IR image data, (b) calibration data, (c) command and control sequences, (d) scaling information, and (e) user-selected options.

12. A camera according to claim 1, further comprising (a) memory means for storing digital calibration information and (b) means for calibrating the FPA selectively for thermal sensitivity relative to the digital calibration information.

13. A camera according to claim 1, further comprising (a) memory means for storing digital calibration information, (b) means for capturing image data of the sky as the digital calibration information, and (c) means for compensating the FPA for thermal sensitivity so as to more accurately identify thermal temperature differences in a thermal scene.

14. A camera according to claim 13, wherein the means for capturing image data of the sky comprises a gravity switch for generating a calibration cycle signal when the camera inverts.

15. A camera according to claim 1, further comprising (a) an image averaging subsystem that captures a blurred image of a scene viewed by the camera, (b) means for integrating multiple frames of image data during motion of the camera relative to the scene, (c) means for dividing the multiple frames of image data by a total number of frames used in the image data to determine an integrated scene average, and (d) means for compensating the FPA for thermal sensitivity so as to more accurately identify thermal temperature differences in a thermal scene.

16. A camera according to claim 1, further comprising a gravity shutter, the gravity shutter having a shutter surface viewable as an image by the FPA and closing when the camera is tilted backwards or to a specified angle, and a switch for detecting closing of the shutter so as to generate a signal which initiates a calibration cycle, the gravity shutter and the switch providing for acquisition of a calibrated image on the shutter surface, the calibration image being stored in memory and used as a calibration offset for the FPA.

17. A camera according to claim 1, further comprising a manual lens cover to cover the lens, and a software module having a calibration routine that is started by one of (a) a tilt of the camera and/or (b) a manual button.

18. A camera according to claim 1, further comprising a reflective optical element which reflects IR energy from the lens and onto the FPA.

19. A camera according to claim 1, wherein the lens comprises at least one refractive optical element constructed from Germanium.

20. A camera according to claim 1, wherein the lens comprises one aspheric surface.

21. A camera according to claim 1, wherein the lens has one fold mirror to reduce the overall volumetric dimensions of the camera.

22. A camera according to claim 1, further comprising an IR transparent plastic sacrificial cover to protect the lens from physical damage.

23. A camera according to claim 1, further comprising means for controlling the temperature of the FPA.

24. A camera according to claim 23, wherein the means for controlling the temperature is a TE Cooler.

25. A camera according to claim 23, wherein the means for controlling the temperature comprises a passive heat sink which dissipates heat through thermal convection.

26. A camera according to claim 23, wherein the means for controlling the temperature comprises a vented airflow which dissipates heat by venting external air through openings in a housing surrounding the camera and over a heat sink.

27. A camera according to claim 23, wherein the means for controlling the temperature comprises a heat pipe which dissipates heat to an external radiator in an air stream.

28. A camera according to claim 1, wherein the camera has a primary field of view, and further comprising at least one additional IR camera, the additional IR camera having a supplemental field of view formed by (a) a second two dimensional uncooled FPA, (b) a second compound lens for imaging IR radiation onto the second FPA, (c) means for adjusting a distance between the second lens and the second FPA to adjust focus, (d) a second electronic module that controls the additional camera read out, calibration, and signal processing, and (e) means for flexibly coupling the second FPA to the second module wherein the second module and the second FPA are reconfigurable within the vehicle, the camera and the additional IR camera having overlapping fields of view which, in combination, provide a composite field of view that is larger than either of the primary and supplemental fields of view.

29. A camera according to claim 1, further comprising means for sensing solar energy and converting solar energy to power to supply power to the module.

30. A camera according to claim 1, further comprising means for translating, tipping and tilting the FPA relative to an optical axis.

31. A camera according to claim 30, wherein the means for translating, tipping and tilting comprises a three-screw configuration.

32. A camera according to claim 31, wherein the three-screw configuration comprises a differential screw mechanism which has two nested threaded components to selectively obtain displacements equal to a pitch difference between the nested threaded components.

33. A camera according to claim 1, further comprising means for selecting the operational spectral band of the FPA.

34. A camera according to claim 33, wherein the means for selecting the operational spectral band comprises one or more of the following: a single fixed filter in the optical path to the FPA; a filter wheel; a single, continuously-varying filter disc; an electro-optic tunable filter; and a dispersive element.

35. A camera according to claim 1, further comprising means for remotely communicating data to and from the module.

36. An IR reconnaissance airplane, comprising:

an airplane;

a miniaturized IR camera for mounting within the airplane and for capturing a scene of the ground from the airplane, the camera comprising a two dimensional uncooled FPA, a compound lens for imaging IR radiation onto the FPA, means for adjusting a distance between the lens and the FPA to adjust focus, an electronic module that controls camera read out, calibration, and signal processing, and means for flexibly coupling the FPA to the module wherein the module and the FPA are reconfigurable within the airplane.

37. An airplane according to claim 36, further comprising (a) memory means for storing digital calibration information, (b) means for capturing image data of the sky as the digital calibration information, and (c) means for compensating the FPA for thermal sensitivity so as to more accurately identify thermal temperature differences in the scene.

38. An airplane according to claim 37, wherein the means for capturing image data of the sky comprises means for rotating the airplane so that the camera views the sky.

39. An airplane according to claim 36, further comprising means for remotely piloting the airplane.

40. A method for calibrating an IR camera within an airplane, the camera of the type having an uncooled focal plane array, comprising the steps of contolling the airplane so that the camera views the sky, acquiring and storing one or more frames of data representative of a uniform sky scene, and compensating the uncooled focal plane array so as to achieve greater signal uniformity for a uniform temperature scene.

41. A method according to claim 40, further comprising the step of utilizing one of (a) a gravity switch to initiate a calibration cycle when the airplane tilts, and (b) a gravity-controlled shutter which closes when the airplane tilts so that the camera views a substantially uniform scene.

42. A method according to claim 40, further comprising the step of controlling a calibration cycle of the camera by telemetric data remotely communicated to the camera.

\* \* \* \* \*